United States Patent
Neal

(10) Patent No.: US 6,362,554 B1
(45) Date of Patent: Mar. 26, 2002

(54) STATOR ASSEMBLY

(75) Inventor: Griffith D. Neal, Alameda, CA (US)

(73) Assignee: Encap Motor Corporation, Alameda, CA (US)

( * ) Notice: Subject to any disclaimer, the term of this patent is extended or adjusted under 35 U.S.C. 154(b) by 0 days.

(21) Appl. No.: 09/470,429

(22) Filed: Dec. 22, 1999

Related U.S. Application Data

(60) Provisional application No. 60/146,446, filed on Jul. 29, 1999.

(51) Int. Cl.[7] ................................................ H02K 1/12
(52) U.S. Cl. ............................ 310/254; 310/43; 29/596; 264/272.2
(58) Field of Search ............................ 310/43, 51, 89, 310/254; 29/596, 606; 264/272.13, 272.2

(56) References Cited

U.S. PATENT DOCUMENTS

| | | | |
|---|---|---|---|
| 3,590,328 A | 6/1971 | Frescura | 36/708 |
| 3,638,055 A | 1/1972 | Zimmerman et al. | 310/93 |
| 3,874,073 A | 4/1975 | Dochterman et al. | 291/598 |
| 3,942,054 A | 3/1976 | Kristen et al. | 310/179 |
| 3,979,530 A | 9/1976 | Schwider et al. | 427/104 |
| 4,128,527 A | * 12/1978 | Kinjo et al. | 310/43 |
| 4,352,897 A | * 10/1982 | Ogata et al. | 523/220 |
| 4,387,311 A | * 6/1983 | Kobayashi et al. | 310/43 |
| 4,492,889 A | 1/1985 | Fukushi et al. | 310/87 |
| 4,572,979 A | 2/1986 | Haar et al. | 310/68 R |

(List continued on next page.)

FOREIGN PATENT DOCUMENTS

| | | |
|---|---|---|
| BE | 870.878 | 1/1979 |
| BE | 891.258 | 3/1982 |
| DE | 25 39 492 A1 | 3/1977 |
| EP | 0 747 943 A2 | 2/1998 |
| EP | 0 883 171 A1 | 12/1998 |

(List continued on next page.)

OTHER PUBLICATIONS

U.S. application No. 09/470,428, filed Dec. 22, 1999, copy of claims enclosed.
U.S. application No. 09/470,432, filed Dec. 22, 1999, copy of claims enclosed.
U.S. application No. 09/470,430, filed Dec. 22, 1999, copy of claims enclosed.
U.S. application No. 09/470,434, filed Dec. 22, 1999, copy of claims enclosed.
U.S. application No. 09/470,427, filed Dec. 22, 1999, copy of claims enclosed.

(List continued on next page.)

*Primary Examiner*—Joseph Waks
(74) *Attorney, Agent, or Firm*—Steven P. Shurtz; Brinks Hofer Gilson & Lione

(57) ABSTRACT

A high speed spindle motor is constructed from a stator assembly that includes a stator having multiple conductors that create a plurality of magnetic fields when electrical current is conducted by the conductors and a body of a phase change material, such as a thermoplastic, substantially encapsulating the stator. A rotatable hub having a magnet connected thereto is in operable proximity to the stator. The high speed motor also includes a shaft, a bearing surrounding the shaft and one of the bearing or shaft being fixed to the stator assembly and the other of the bearing or shaft being fixed to the rotatable hub. Hard disc drives using the motor, and methods of developing and constructing the motor and hard disc drives are also disclosed.

12 Claims, 13 Drawing Sheets

U.S. PATENT DOCUMENTS

| | | | | |
|---|---|---|---|---|
| 4,679,313 A | * | 7/1987 | Schultz et al. | 29/596 |
| 4,760,299 A | * | 7/1988 | Dickie et al. | 310/91 |
| 4,801,833 A | | 1/1989 | Dye | 310/239 |
| 4,853,576 A | | 8/1989 | Mayumi et al. | 310/239 |
| 4,858,073 A | | 8/1989 | Gregory | 361/708 |
| 4,868,970 A | * | 9/1989 | Schultz et al. | 29/596 |
| 4,954,739 A | * | 9/1990 | Schultz et al. | 310/156 |
| 5,008,572 A | * | 4/1991 | Marshall et al. | 310/45 |
| 5,036,580 A | | 8/1991 | Fox et al. | 29/605 |
| 5,073,735 A | | 12/1991 | Takagi | 310/71 |
| 5,075,585 A | | 12/1991 | Teruyama et al. | 310/89 |
| 5,121,021 A | | 6/1992 | Ward | 310/154 |
| 5,134,327 A | | 7/1992 | Sumi et al. | 310/43 |
| 5,142,103 A | | 8/1992 | Stine | 174/52.2 |
| 5,147,982 A | | 9/1992 | Steffen | 174/52.2 |
| 5,206,554 A | | 4/1993 | Perrot | 310/40 MM |
| 5,268,607 A | | 12/1993 | McManus | 310/89 |
| 5,334,897 A | | 8/1994 | Ineson et al. | 310/89 |
| 5,345,129 A | | 9/1994 | Molnar | 310/156 |
| 5,382,852 A | | 1/1995 | Yuhi et al. | 310/40 MM |
| 5,396,210 A | | 3/1995 | Purohit et al. | 336/60 |
| 5,400,218 A | | 3/1995 | Val | 361/709 |
| 5,414,317 A | | 5/1995 | Reid et al. | 310/239 |
| 5,461,772 A | | 10/1995 | Puri | 29/605 |
| 5,500,780 A | | 3/1996 | Boutaghou et al. | 360/99.08 |
| 5,506,458 A | | 4/1996 | Pace et al. | 310/67 R |
| 5,541,787 A | | 7/1996 | Jabbari et al. | 360/97.01 |
| 5,548,458 A | | 8/1996 | Pelstring et al. | 360/99.08 |
| 5,558,445 A | | 9/1996 | Chen et al. | 389/132 |
| 5,579,188 A | | 11/1996 | Dunfield et al. | 360/99.08 |
| 5,587,617 A | | 12/1996 | Dunfield et al. | 310/90.5 |
| 5,598,048 A | | 1/1997 | Dunfield et al. | 310/90.5 |
| 5,610,463 A | | 3/1997 | Dunfield et al. | 310/90.5 |
| 5,619,083 A | | 4/1997 | Dunfield et al. | 310/90.5 |
| 5,619,389 A | | 4/1997 | Dunfield et al. | 360/98.07 |
| 5,621,372 A | | 4/1997 | Purohit | 336/60 |
| 5,633,545 A | | 5/1997 | Albrecht et al. | 310/670 |
| 5,666,242 A | | 9/1997 | Edwards et al. | 360/265 |
| 5,668,427 A | | 9/1997 | Morita | 310/216 |
| 5,672,927 A | | 9/1997 | Viskochil | 310/194 |
| 5,675,196 A | | 10/1997 | Huang et al. | 310/67 R |
| 5,694,268 A | | 12/1997 | Dunfield et al. | 310/67 R |
| 5,698,919 A | | 12/1997 | Obara | 310/90 |
| 5,728,600 A | | 3/1998 | Saxelby, Jr. et al. | 264/272.11 |
| 5,729,404 A | | 3/1998 | Dunfield et al. | 360/99.08 |
| 5,742,450 A | | 4/1998 | Moser | 360/99.08 |
| 5,751,085 A | * | 5/1998 | Hayashi | 310/90 |
| 5,751,514 A | | 5/1998 | Hyde et al. | 360/97.01 |
| 5,766,535 A | | 6/1998 | Ong | 264/272.11 |
| 5,783,888 A | | 7/1998 | Yamano | 310/91 |
| 5,806,169 A | | 9/1998 | Trago et al. | 29/596 |
| 5,814,412 A | | 9/1998 | Terada et al. | 428/958 |
| 5,850,318 A | | 12/1998 | Dunfield et al. | 360/99.08 |
| 5,880,179 A | * | 3/1999 | Ito et al. | 523/433 |
| 5,881,447 A | | 3/1999 | Molnar | 29/598 |
| 5,942,824 A | * | 8/1999 | Shioya et al. | 310/90.5 |
| 5,958,466 A | | 9/1999 | Ong | 425/127 |
| 5,973,424 A | | 10/1999 | Engelberger et al. | 360/97.01 |
| 5,982,247 A | | 11/1999 | Imada et al. | 310/43 |
| 5,990,583 A | | 11/1999 | Terada et al. | 310/43 |
| 6,002,185 A | * | 12/1999 | Nakao et al. | 310/43 |
| 6,019,516 A | | 2/2000 | Leuthold et al. | 384/107 |
| 6,020,661 A | | 2/2000 | Trago et al. | 310/43 |
| 6,034,841 A | | 3/2000 | Albrecht et al. | 36/43 |
| 6,043,583 A | | 3/2000 | Kurosawa et al. | 310/254 |
| 6,071,014 A | | 6/2000 | Lee et al. | 384/110 |

FOREIGN PATENT DOCUMENTS

| | | |
|---|---|---|
| FR | 2 647 958 | 12/1990 |
| JP | 5336722 | 12/1993 |
| JP | 10070870 | 3/1998 |
| JP | 410271719 | 10/1998 |
| JP | 11082508 | 3/1999 |
| SU | 1334297 | 8/1987 |
| SU | 1494148 | 7/1989 |
| WO | WO 92/06532 | 4/1992 |
| WO | WO 96/20501 | 7/1996 |
| WO | WO 96/33533 | 10/1996 |
| WO | WO 97/39870 | 10/1997 |

OTHER PUBLICATIONS

U.S. application No. 09/470,431, filed Dec. 22, 1999, copy of claims enclosed.

U.S. application No. 09/470,433, filed Dec. 22, 1999, copy of claims enclosed.

U.S. application No. 09/470,425, filed Dec. 22, 1999, copy of claims enclosed.

U.S. application No. 09/470,426, filed Dec. 22, 1999, copy of claims enclosed.

U.S. application No. 09/470,424, filed Dec. 22, 1999, copy of claims enclosed.

U.S. application No. 09/738,268, filed Dec. 15, 2000, copy of application as originally filed enclosed.

Product Information from Dupont Engineering Polymers entitled "Electrical/Electronic Thermoplastic Encapsulation," (no date), Publ. Reorder No.: H–58633 (R, 96.7), 20 pages.

The Epoxylite Corporation, article from the Internet entitled "Vacuum Pressure Impregnation (VPI) Systems", Nov. 19, 1999, <http://www.epoxylite.com/EpoxyliteEquipment.htm>, 3 pages.

Buchanan Motor Works, Inc., article from the Internet entitled "Epoxy Seal—Prevents Down Time and Keeps Equipment Running Longer," Jul. 14, 1999, <http://www.b-mwworks.com/VIP.htm>, 1 page.

Neeltran Inc., article from the Internet entitled "Vacuum Pressure Impregnation (VPI)", Nov. 19, 1999, <http://www.neeltran.thomasregister.com/olc/neeltran/neel9.htm> 2 pages.

LNP Engineering Plastics, Press Release entitled "LNP Introduces First–Ever Line of Thermally Conductive Compounds," Jan. 28, 1999 (2 pages).

LNP Engineering Plastics, Advertisement entitled "Konduit™ Thermally Conductive Composites," undated (2 pages).

* cited by examiner

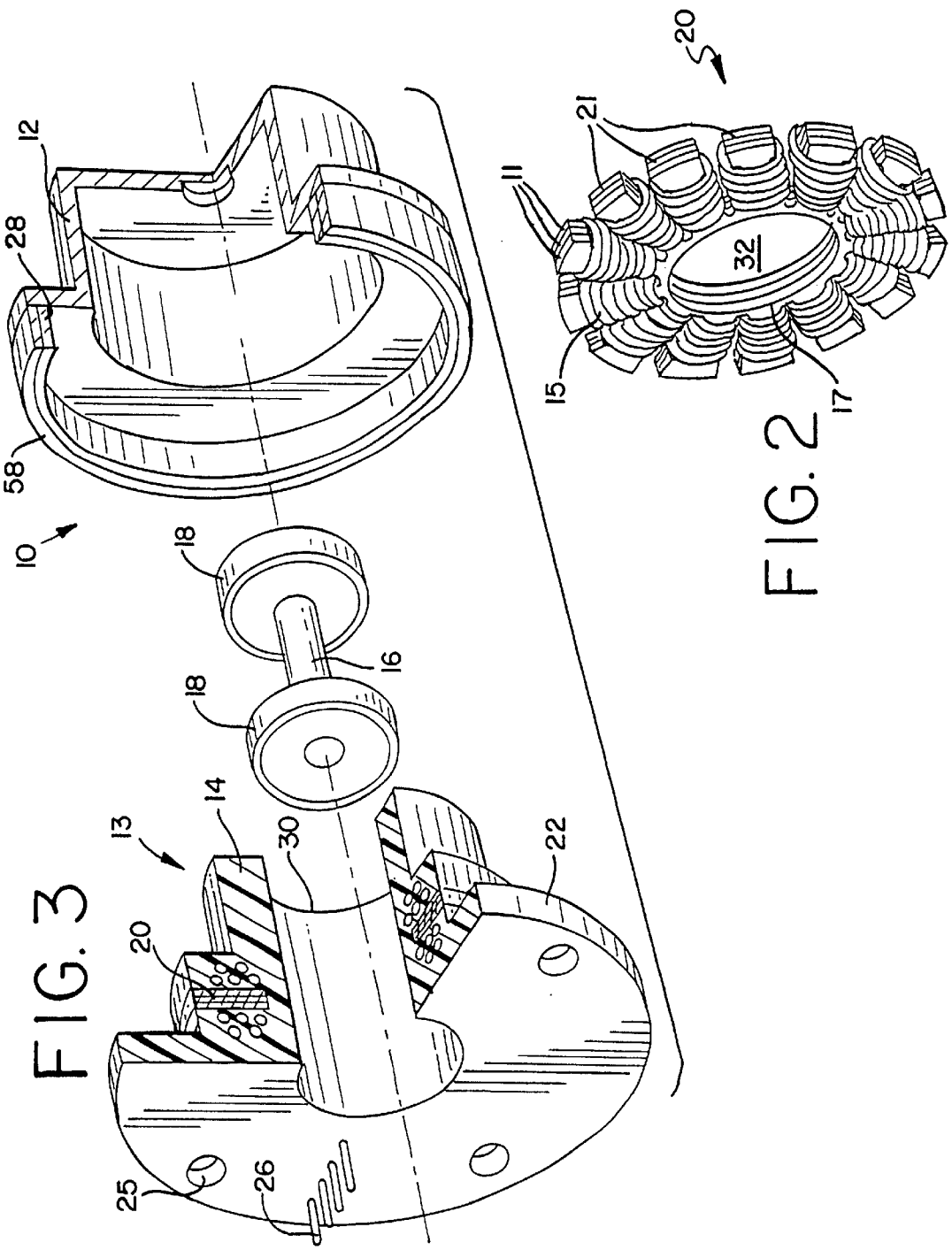

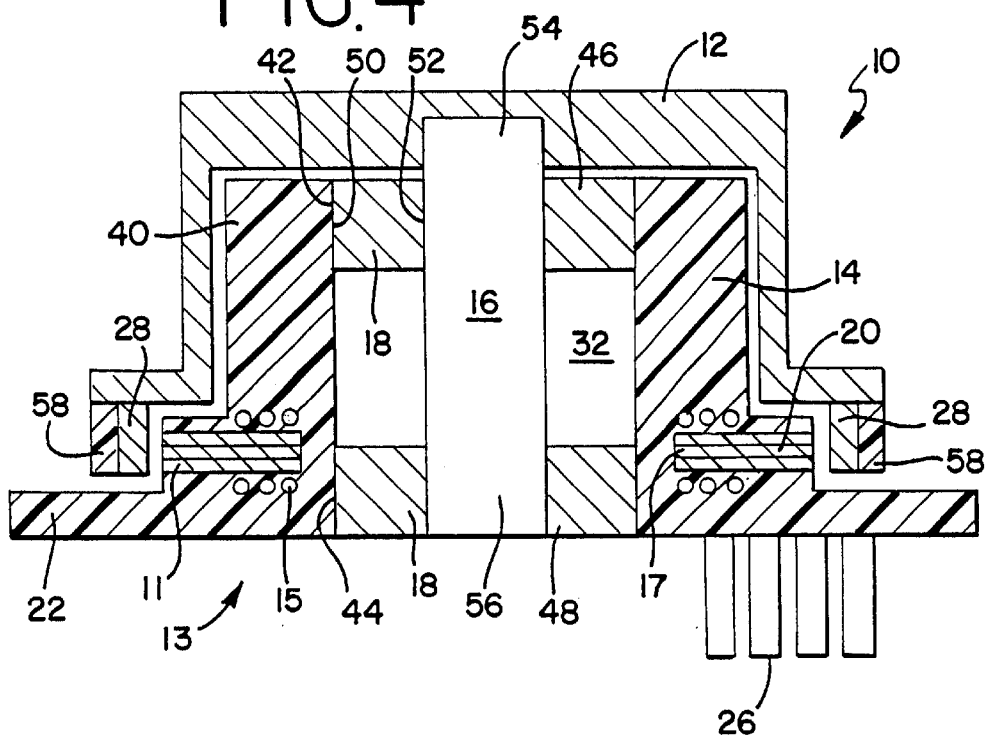
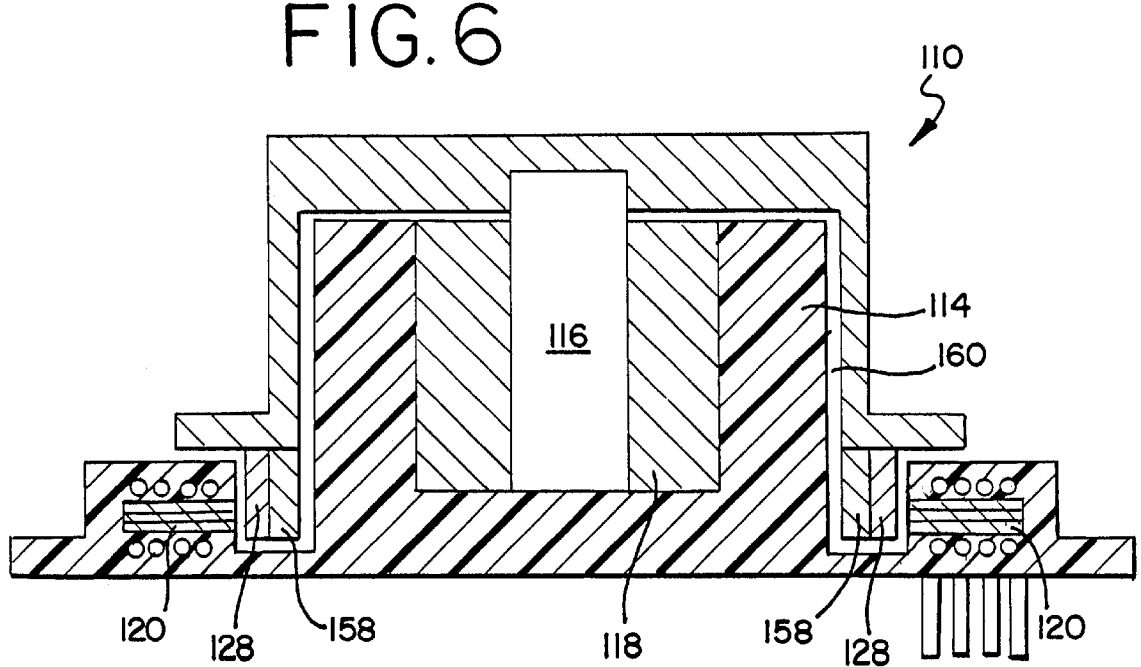

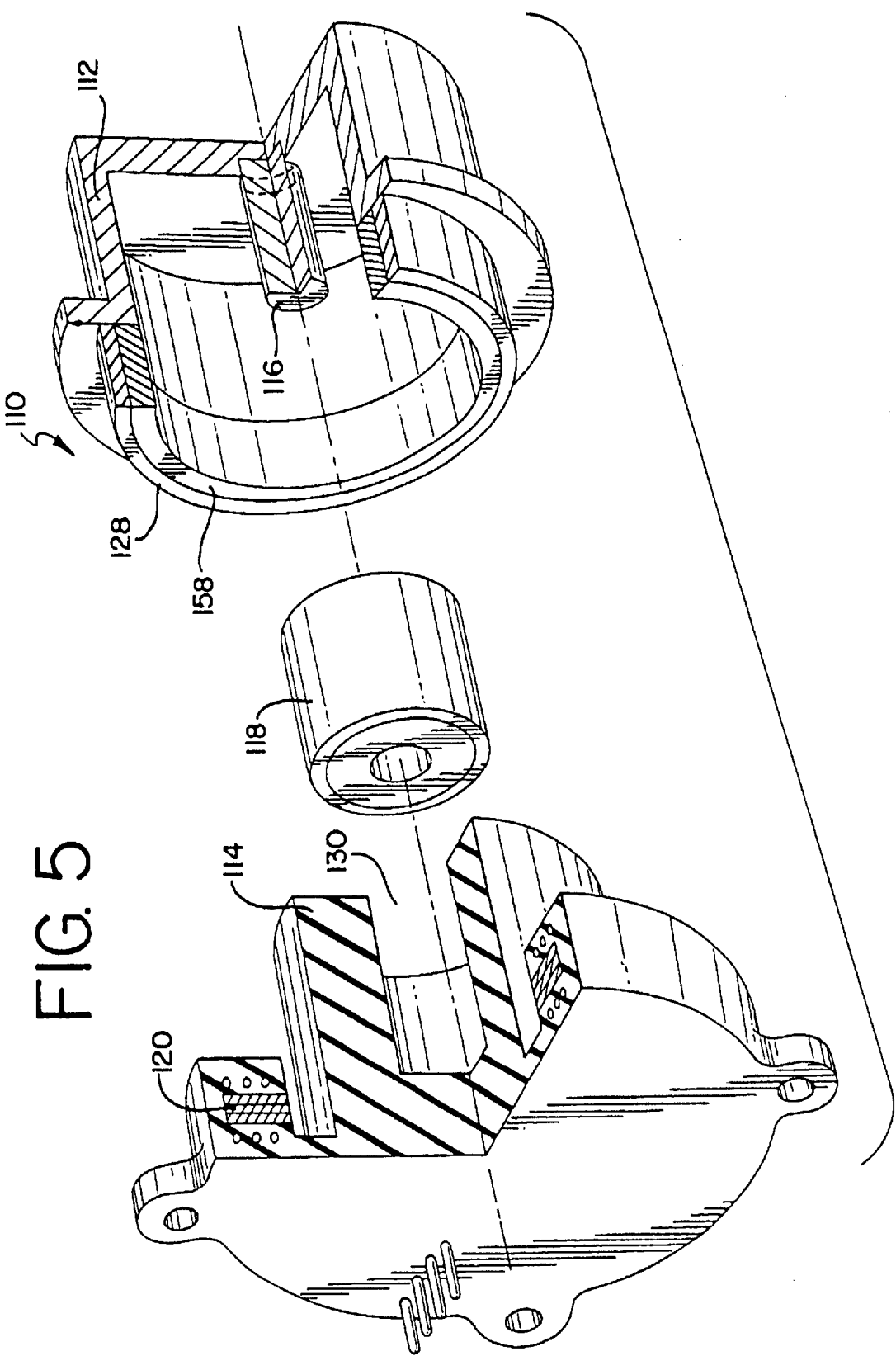

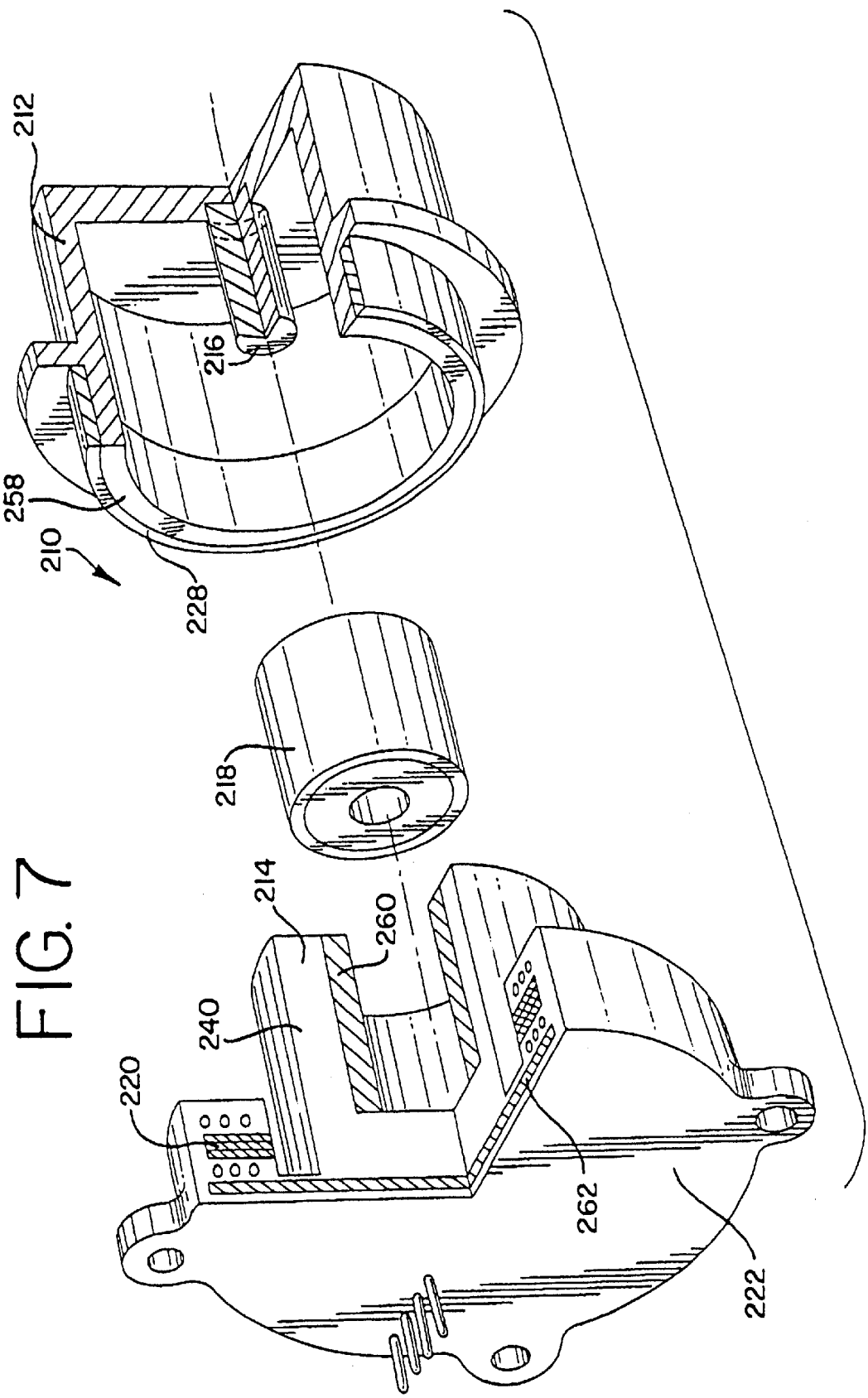

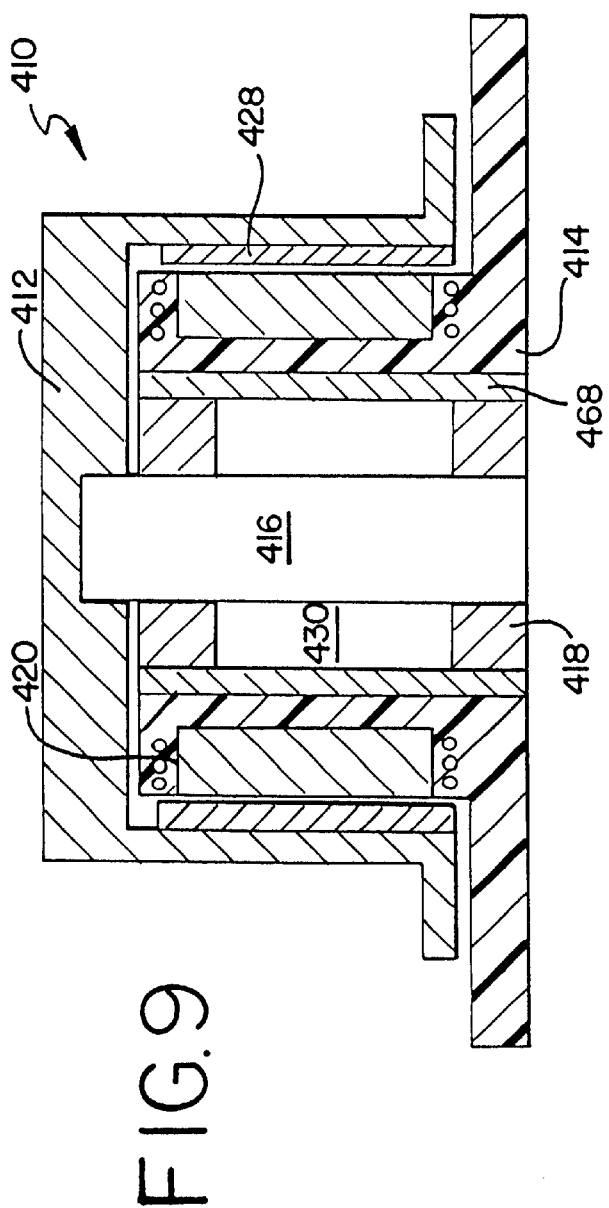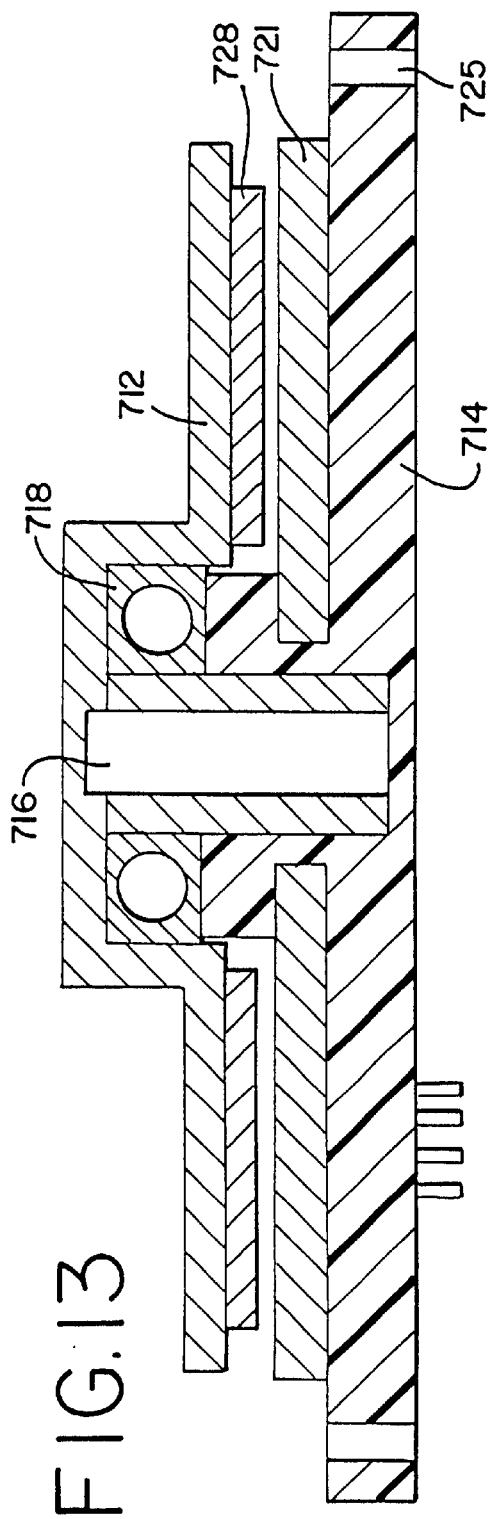

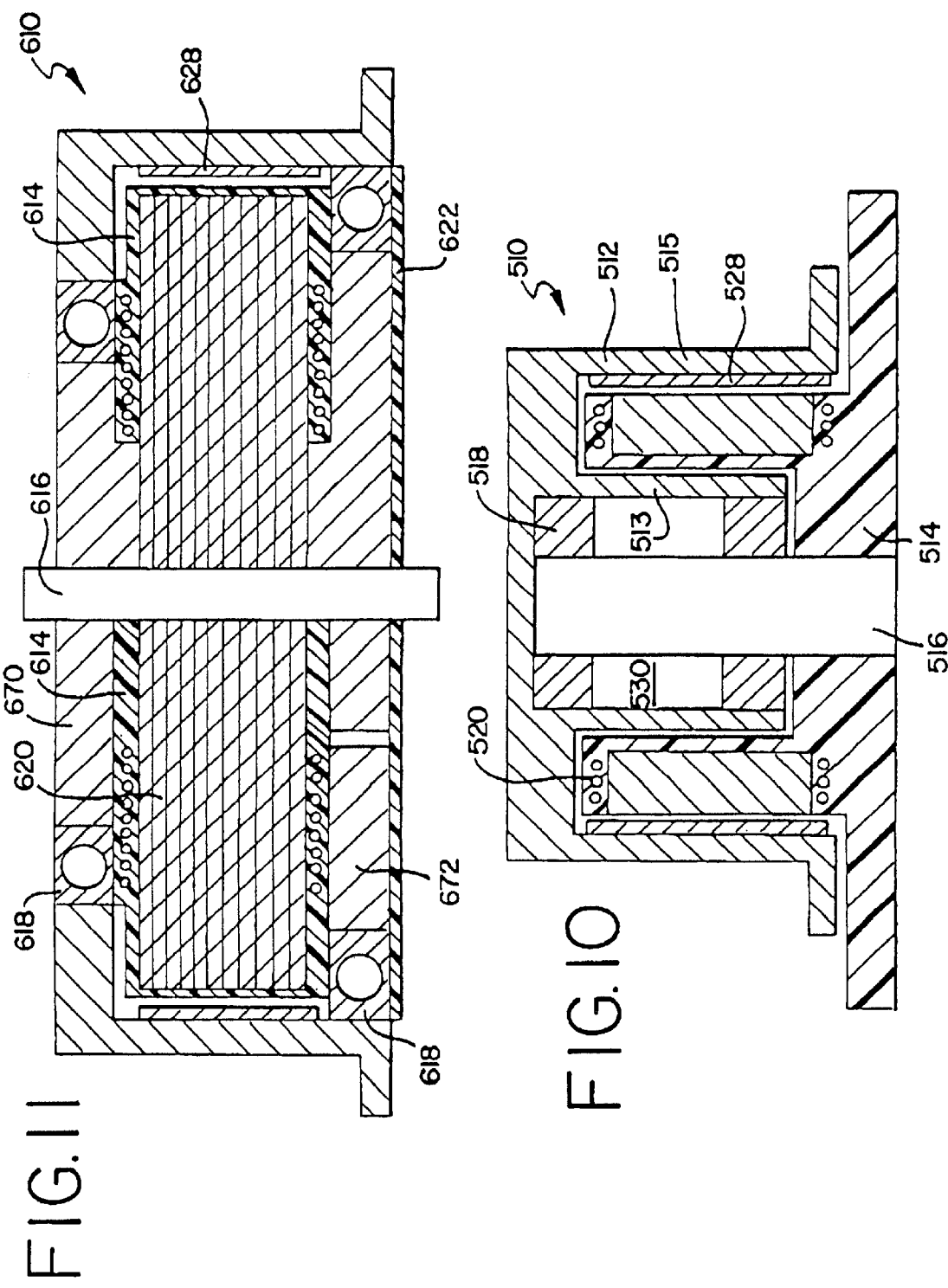

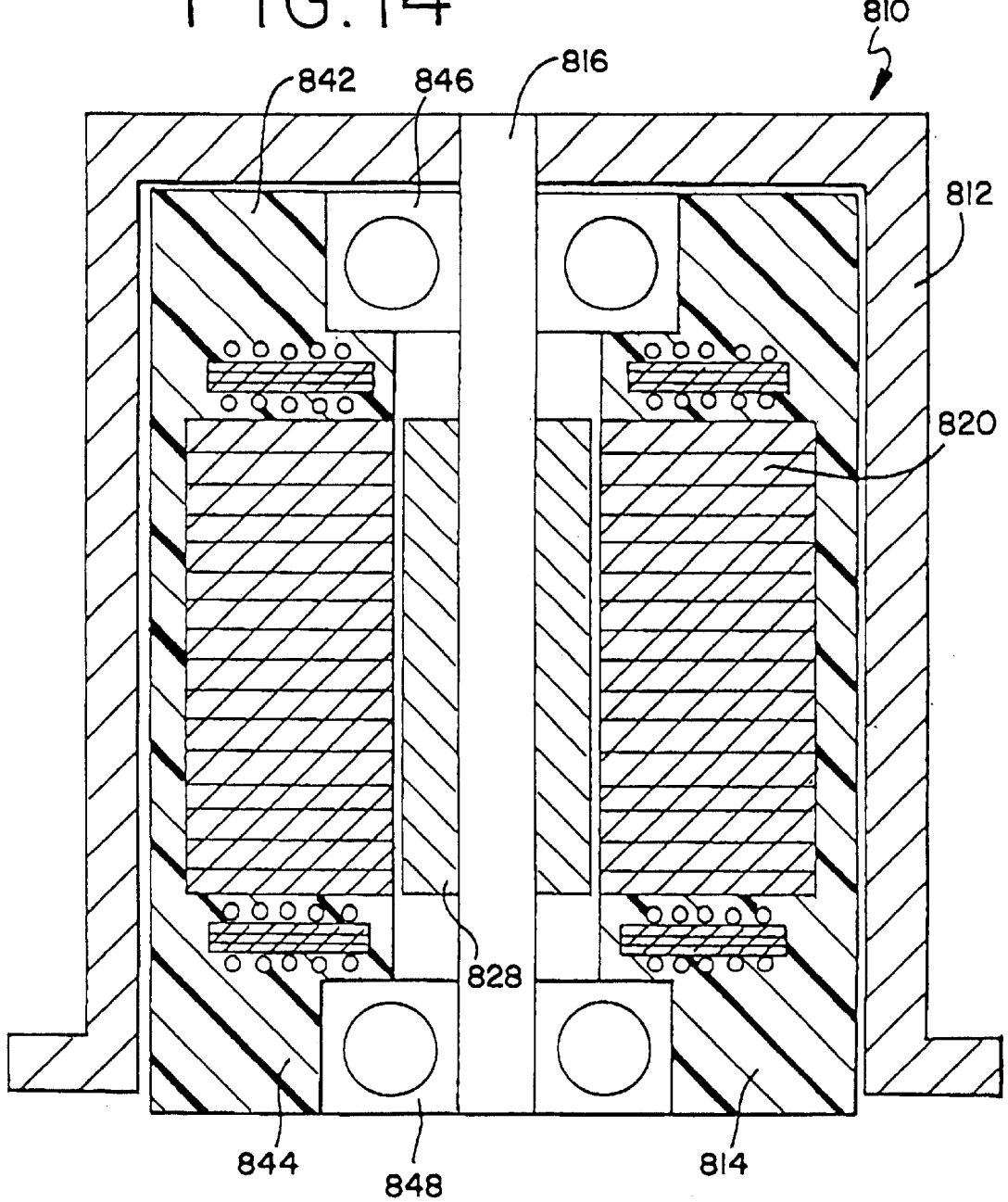

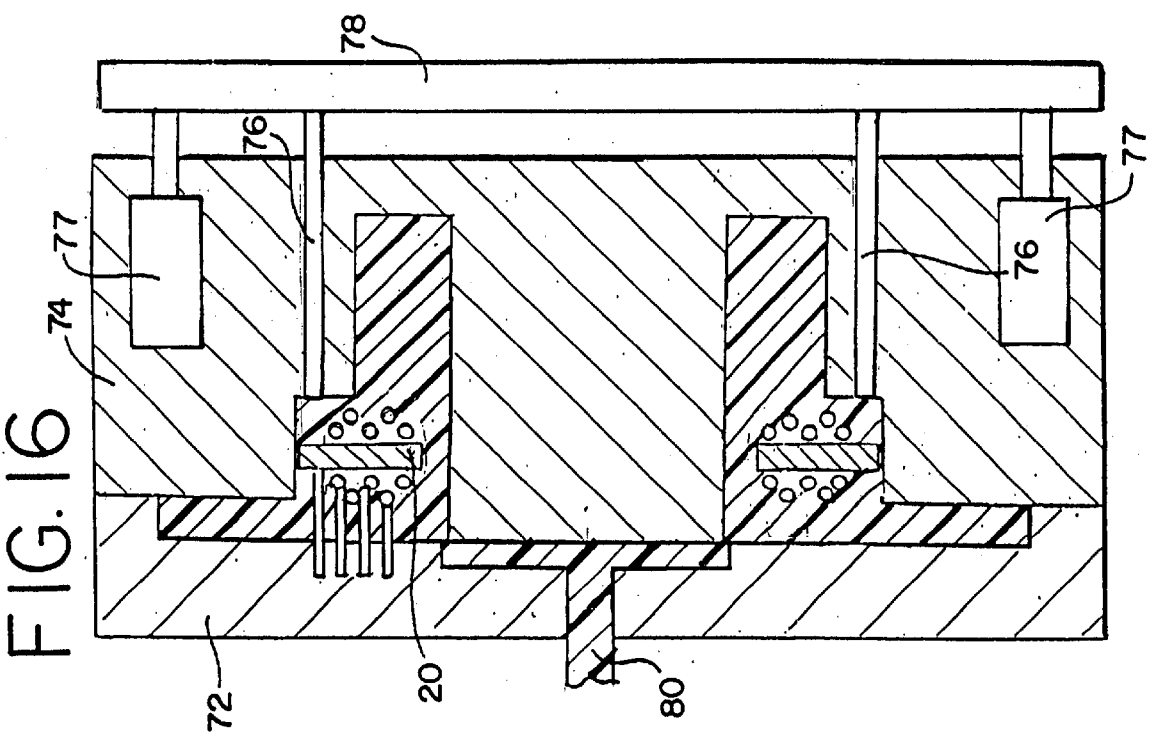
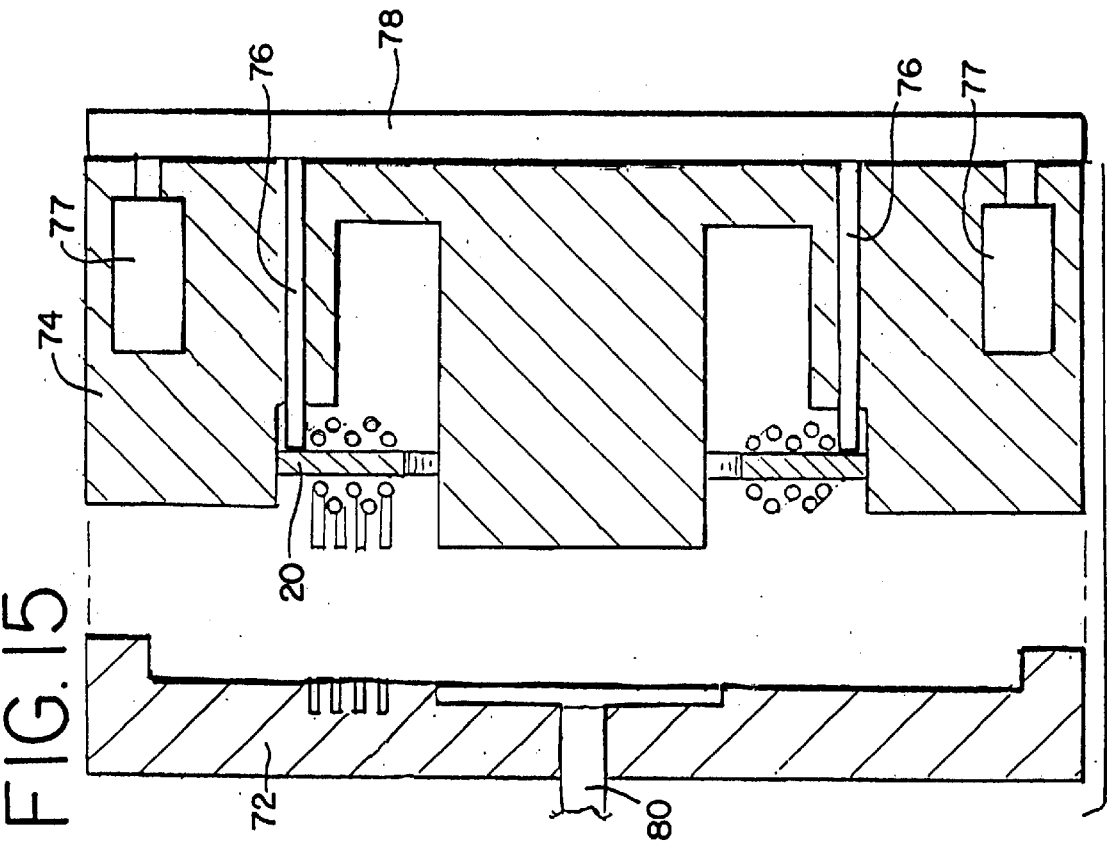

STATOR ASSEMBLY

REFERENCE TO EARLIER FILED APPLICATION

The present application claims the benefit of the filing date under 35 U.S.C. §119(e) of provisional U.S. patent application Ser. No. 60/146,446, filed Jul. 29, 1999, which is hereby incorporated by reference.

FIELD OF THE INVENTION

The present invention relates generally to a high speed motor. It relates particularly to a spindle motor such as used in a hard disc drive, and to the construction and arrangement of the body of the spindle motor to align and retain the respective component parts of the motor, as well as stator assemblies used in the motors and hard disc drives using the motors, and methods of developing and manufacturing high speed motors.

BACKGROUND OF THE INVENTION

Computers commonly use disc drives for memory storage purposes. Disc drives include a stack of one or more magnetic discs that rotate and are accessed using a head or read-write transducer. Typically, a high speed motor such as a spindle motor is used to rotate the discs.

An example of a conventional spindle motor 1 is shown in FIG. 1. The motor 1 includes a base 2 which is usually made from die cast aluminum, a stator 4, a shaft 6, bearings 7 and a disc support member 8, also referred to as a hub. A magnet 3 and flux return ring 5 are attached to the disc support member 8. The stator 4 is separated from the base 2 using an insulator (not shown) and attached to the base 2 using a glue. Distinct structures are formed in the base 2 and the disc support member 8 to accommodate the bearings 7. One end of the shaft 6 is inserted into the bearing 7 positioned in the base 2 and the other end of the shaft 6 is placed in the bearing 7 located in the hub 8. A separate electrical connector 9 may also be inserted into the base 2.

Each of these parts must be fixed at predefined tolerances with respect to one another. Accuracy in these tolerances can significantly enhance motor performance.

In operation, the disc stack is placed upon the hub. The stator windings are selectively energized and interact with the permanent magnet to cause a defined rotation of the hub. As hub 8 rotates, the head engages in reading or writing activities based upon instructions from the CPU in the computer.

Manufacturers of disc drives are constantly seeking to improve the speed with which data can be accessed. To an extent, this speed depends upon the speed of the spindle motor, as existing magneto-resistive head technology is capable of accessing data at a rate greater than the speed offered by the highest speed spindle motor currently in production. The speed of the spindle motor is dependent upon the dimensional consistency or tolerances between the various components of the motor. Greater dimensional consistency between components leads to a smaller gap between the stator 4 and the magnet 3, producing more force, which provides more torque and enables faster acceleration and higher rotational speeds. One drawback of conventional spindle motors is that a number of separate parts are required to fix motor components to one another. This can lead to stack up tolerances which reduce the overall dimensional consistency between the components. Stack up tolerances refers to the sum of the variation of all the tolerances of all the parts, as well as the overall tolerance that relates to the alignment of the parts relative to one another.

In an effort to enable increased motor speed, some hard disc manufacturers have turned to the use of hydrodynamic bearings. These hydrodynamic bearings, however, have different aspect ratios from conventional bearings. An example of a different aspect ratio may be found in a cylindrical hydrodynamic bearing in which the length of the bearing is greater than it's diameter. This results in more susceptibility to problems induced by differing coefficients of thermal expansion than other metals used in existing spindle motors, making it difficult to maintain dimensional consistency over the operating temperature that the drive sees between the hydrodynamic bearings and other metal parts of the motor. Hydrodynamic bearings have less stiffness than conventional ball bearings so they are more susceptible to imprecise rotation when exposed to vibrations or shock.

An important characteristic of a hard drive is the amount of information that can be stored on a disc. One method to store more information on a disc is to place data tracks more closely together. Presently this spacing between portions of information is limited due to vibrations occurring during the operation of the motor. These vibrations can be caused when the stator windings are energized, which results in vibrations of a particular frequency. These vibrations also occur from harmonic oscillations in the hub and discs during rotation, caused primarily by non-uniform size media discs.

An important factor in motor design is the lowering of the operating temperature of the motor. Increased motor temperature affects the electrical efficiency of the motor and bearing life. As temperature increases, resistive loses in wire increase, thereby reducing total motor power. Furthermore, the Arhennius equation predicts that the failure rate of an electrical device is exponentially related to its operating temperature. The frictional heat generated by bearings increases with speed. Also, as bearings get hot they expand, and the bearing cages get stressed and may deflect, causing non-uniform rotation and the resultant further heat increase, non-uniform rotation requiring greater spacing in data tracks, and reduced bearing life. One drawback with existing motor designs is their limited effective dissipation of the heat, and difficulty in incorporating heat sinks to aid in heat dissipation. In addition, in current motors the operating temperatures generally increase as the size of the motor is decreased.

Manufacturers have established strict requirements on the outgassing of materials that are used inside a hard disc drive. These requirements are intended to reduce the emission of materials onto the magnetic media or heads during the operation of the drive. Of primary concern are glues used to attach components together, varnish used to insulate wire, and epoxy used to protect steel laminations from oxidation.

In addition to such outgassed materials, airborne particulate in a drive may lead to head damage. Also, airborne particulates in the disc drive could interfere with signal transfer between the read/write head and the media. To reduce the effects of potential airborne particulate, hard drives are manufactured to exacting clean room standards and air filters are installed inside of the drive to reduce the contamination levels during operation.

Heads used in disc drives are susceptible to damage from electrical shorts passing through a small air gap between the media and the head surface. In order to prevent such shorts, some hard drives use a plastic or rubber ring to isolate the spindle motor from the hard drive case. A drawback to this design is the requirement of an extra component.

Another example of a spindle motor is shown in U.S. Pat. No. 5,694,268 (Dunfield et al.) (incorporated herein by reference). Referring to FIGS. 7 and 8 of this patent, a stator 200 of the spindle motor is encapsulated with an overmold 209. The overmolded stator contains openings through which mounting pins 242 may be inserted for attaching the stator 200 to a base. U.S. Pat. No. 5,672,972 (Viskochil) (incorporated herein by reference) also discloses a spindle motor having an overmolded stator. One drawback with the overmold used in these patents is that it has a different coefficient of linear thermal expansion ("CLTE") than the corresponding metal parts to which it is attached. Another drawback with the overmold is that it is not very effective at dissipating heat. Further, the overmolds shown in these patents are not effective in dampening some vibrations generated by energizing the stator windings.

U.S. Pat. No. 5,806,169 (Trago) (incorporated herein by reference) discloses a method of fabricating an injection molded motor assembly. However, the motor disclosed in Trago is a step motor, not a high speed spindle motor, and would not be used in applications such as hard disc drives. Thus, a need exists for an improved high speed spindle motor, having properties that will be especially useful in a hard disc drive, overcoming the aforementioned problems.

BRIEF SUMMARY OF THE INVENTION

A high speed motor has been invented which overcomes many of the foregoing problems. In addition, unique stator assemblies and other components of a high speed motor have been invented, as well as methods of manufacturing and developing motors and hard disc drives. In one aspect, the invention is a high speed spindle motor comprising: a stator assembly, including a stator having multiple conductors that create a plurality of magnetic fields when electrical current is conducted by the conductors; and a body of a phase change material substantially encapsulating the stator; a rotatable hub having a magnet connected thereto in operable proximity to the stator; a shaft; a bearing around the shaft; and one of the shaft or bearing being fixed to the stator assembly and the other of the shaft or bearing being fixed to the rotatable hub.

In another aspect the invention is a stator assembly comprising a) a magnetically inducible core; b) a plurality of conductors in proximity to the core such that magnetic fields are induced in the core when electrical current is conducted through the conductors; and c) a body of a phase change material substantially encapsulating the core and conductors, the phase change material having a coefficient of linear thermal expansion approximately the same as the coefficient of linear thermal expansion of the core.

In another aspect the invention is a stator assembly comprising: a) a stator having multiple conductors that create a plurality of magnetic fields when electrical current is conducted through the conductors; and b) a body of phase change material substantially encapsulating the conductors, the phase change material having a thermal conductivity of at least 0.7 watts/meter° K. and a dielectric strength of at least 250 volts/mil.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 2 is a perspective view of a stator used in a first embodiment of the present invention.

FIG. 3 is an exploded, partial cross-sectional and perspective view of a high speed motor in accordance with the first embodiment of the present invention.

FIG. 4 is a cross-sectional view of the high speed motor of FIG. 3.

FIG. 5 is an exploded, partial cross-sectional and perspective view of a high speed motor in accordance with a second embodiment of the present invention.

FIG. 6 is a cross-sectional view of the high speed motor shown in FIG. 5.

FIG. 7 is an exploded, partial cross-sectional and perspective view of a high speed motor in accordance with a third embodiment of the present invention.

FIG. 9 is a cross-sectional view of a high speed motor in accordance with a fifth embodiment of the present invention.

FIG. 10 is a cross-sectional view of a high speed motor in accordance with a sixth embodiment of the present invention.

FIG. 11 is a cross-sectional view of a high speed motor in accordance with a seventh embodiment of the present invention.

FIG. 13 is a cross-sectional view of a high speed motor in accordance with an eighth embodiment of the present invention.

FIG. 14 is an exploded, partial cross-sectional and perspective view of a high speed motor in accordance with the ninth embodiment of the present invention.

FIG. 15 is a drawing of a mold used to make the encapsulated stator of FIG. 3.

FIG. 16 is a drawing of the mold of FIG. 15 in a closed position.

DETAILED DESCRIPTION OF THE DRAWINGS AND PREFERRED EMBODIMENTS OF THE INVENTION

First Embodiment

Figure 1:
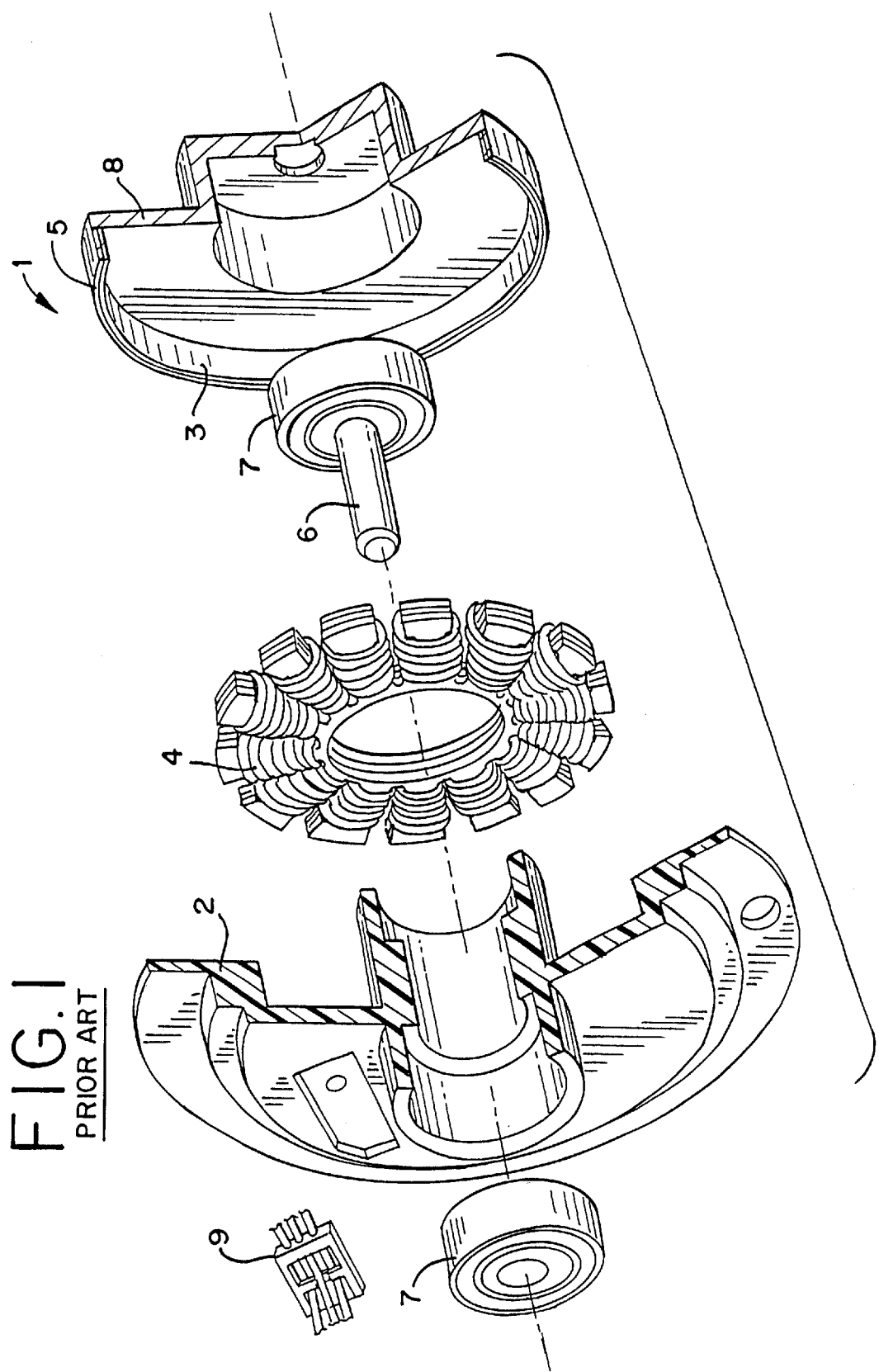
FIG. 1 is an exploded, partial cross-sectional and perspective view of a prior art high speed motor.

A first embodiment of a high speed motor of the present invention is shown in FIGS. 2–4. By "high speed" it is meant that the motor can operate at over 5,000 rpm. The spindle motor 10 is designed for rotating a disc or stack of discs in a computer hard disc drive. Motor 10 is formed using an encapsulation method which reduces the number of parts needed to manufacture the motor as compared with conventional motors used for disc drives, thereby reducing stack up tolerances and manufacturing costs and producing other advantages discussed below.

Referring to FIG. 2, a stator 20 is first constructed, using conventional steel laminations 11 forming a magnetically inducible core 17 having a plurality of salient poles 21 thereon, and wire windings 15 which serve as conductors. The conductors induce or otherwise create a plurality of magnetic fields in the core when electrical current is conducted through the conductors. In this embodiment, a magnetic field is induced in each of the poles 21.

The stator 20 is then used to construct the rest of the spindle motor 10 (FIG. 3). The spindle motor 10 includes a hub 12, which serves as a disc support member, the stator 20 and a body 14. Together the stator 20 and body 14 make up a stator assembly 13. The body 14 is preferably a monolithic body 14. Monolithic is defined as being formed as a single piece. The body 14 substantially encapsulates the stator 20. Substantial encapsulation means that the body 14 either entirely surrounds the stator 20, or surrounds almost all of it except for minor areas of the stator that may be exposed. However, substantial encapsulation means that the body 14 and stator 20 are rigidly fixed together, and behave as a single component with respect to harmonic oscillation vibration.

The body 14 is preferably formed of a phase change material, meaning a material that can be used in a liquid phase to envelope the stator, but which later changes to a solid phase. There are two types of phase change materials that will be most useful in practicing the invention: temperature activated and chemically activated. A temperature activated phase change material will become molten at a higher temperature, and then solidify at a lower temperature. However, in order to be practical, the phase change material must be molten at a temperature that is low enough that it can be used to encapsulate a stator. Preferred temperature activated phase change materials will be changed from a liquid to a solid at a temperature in the range of about 200 to 700° F. The most preferred temperature activated phase change materials are thermoplastics. The preferred thermoplastic will become molten at a temperature at which it is injection-moldable, and then will be solid at normal operating temperatures for the motor. An example of a phase change material that changes phases due to a chemical reaction, and which could be used to form the body 14, is an epoxy. Other suitable phase change materials may be classified as thermosetting materials.

As shown in FIG. 4, a shaft 16 is connected to the hub or disc support member 12 and is surrounded by bearings 18, which are adjacent against the body 14. A rotor or magnet 28 is fixed to the inside of the hub 12 on a flange so as to be in operable proximity to the stator. The magnet 28 is preferably a permanent magnet, as described below. The body 14 includes a base 22. In addition, mounting features, such as apertures 25, and terminals comprising a connector 26 for connecting the conductors to an external power source are formed as a part of the stator assembly. The terminals 26 are partially encapsulated in the body 14.

Referring to FIGS. 3–4, the base 22 of the body 14 is generally connected to the hard drive case (not shown). Connecting members (not shown), such as screws, may be used to fix the base 22 to the hard drive case, using holes 25 as shown in FIG. 3. Alternatively, other types of mounting features such as connecting pins or legs may be formed as part of the base 22. The connector 26 is preferably a through-hole pin type of connector 26 and is coupled through the hard drive case to the control circuit board residing on the outer surface of the base (not shown). Alternatively the connector may be a flexible circuit with copper pads allowing spring contact interconnection.

The stator 20 is positioned in the body 14 generally in a direction perpendicular to an interior portion 30. Referring to FIG. 2, the stator 20 is preferably annular in shape and contains an open central portion 32. The poles 21 extend radially outward from this central portion 32. Faces of the poles 21 are positioned outward relative to the central portion 32 of the stator 20. The body 14 is molded around the stator 20 in a manner such that the faces of the poles are exposed and are surrounded by and aligned concentrically with respect to the disc support member 12. Alternatively, the poles may be totally encapsulated in body 14 and not be exposed.

Referring to FIG. 4, the body 14 has an upper portion 40 that extends upwardly from the stator 20. The upper portion 40 is also preferably annular shaped. The body 14 includes the interior portion 30. The interior portion 30 is generally sized and shaped to accommodate the bearings 18. The interior portion 30 includes an upper support portion 42 and a lower support portion 44. In the embodiment illustrated in FIG. 4 the interior portion 30 is preferably cylindrically shaped.

The phase change material used to make the body 14 is preferably a thermally conductive but non-electrically conductive plastic. In addition, the plastic preferably includes ceramic filler particles that enhance the thermal conductivity of the plastic. A preferred form of plastic is polyphenyl sulfide (PPS) sold under the tradename "Konduit" by LNP. Grade OTF-212 PPS is particularly preferred. Examples of other suitable thermoplastic resins include, but are not limited to, thermoplastic resins such as 6,6-polyamide, 6-polyamide, 4,6-polyamide, 12,12-polyamide, 6,12-polyamide, and polyamides containing aromatic monomers, polybutylene terephthalate, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate, may also be used in this invention.

Referring to FIG. 4, the bearings 18 include an upper bearing 46 and a lower bearing 48. Also, each bearing 18 has an outer surface 50 and an inner surface 52. The outer surface 50 of the upper bearing contacts the upper support portion 42 and the outer surface 50 of the lower bearing 48 contacts the lower support portion 44. The inner surfaces 52 of the bearings 18 contact the shaft 16. The bearings are preferably annular shaped. The inner surfaces 52 of the bearings 18 may be press fit onto the shaft 16. A glue may also be used. The outer surface 50 of the bearings 18 may be press fit into the interior portion 30 of the body 14. A glue may also be used. The bearings in the embodiment shown in FIGS. 3–4 are ball bearings. Alternatively other types of bearings, such as hydrodynamic or combinations of hydrodynamic and magnetic bearings, may be used. The bearings are typically made of stainless steel.

The shaft 16 is concentrically disposed within the interior portion 30 of the body 14. The bearings 18 surround portions of the shaft 16. As described above, the inner surfaces 52 of the bearings are in contact with the shaft 16. The shaft 16 includes a top portion 54 and a bottom portion 56. The top portion 54 of the shaft 16 is fixed to the hub 12. The bottom portion 54 of the shaft 16 is free to rotate inside the lower bearing. Thus, in this embodiment, the shaft 16 is freely rotatable relative to the body 14. The shaft 16 is preferably cylindrical shaped. The shaft 16 may be made of stainless steel.

Referring to FIG. 4, the hub 12 is concentrically disposed around the body 14. The hub 12 is fixed to the shaft 16 and is spaced apart from the body 14. The hub 12 includes a flux return ring 58 and the magnet 28. The flux return ring 58 is glued to the disc support member. The magnet 28 is glued to the hub 12. As shown in FIG. 4, the magnet 28 concentrically surrounds the portion of the body 14 that includes the stator 20. In this embodiment the magnet 28 and stator 20 are generally coplanar when the motor 10 is assembled.

The magnet 28 is preferably a sintered part and is one solid piece. The magnet 28 is placed in a magnetizer which puts a plurality of discrete North and South poles onto the magnet 28, dependant on the number of poles 21 on the stator 20. The flux return ring 58 is preferably made of a magnetic steel. The hub is preferably made of aluminum. Also, the hub may be made of a magnetic material to replace the flux return ring.

Operation of the First Embodiment

In operation, the spindle motor shown in FIGS. 3–4 is driven by supplying electrical pulses to the connector 26. These pulses are used to selectively energize the windings 15 around the stator 20 poles 21. This results in a moving magnetic field. This magnetic field interacts with the magnetic field generated by the magnet 28 in a manner that causes the magnet 28 to rotate about the body 14. As a result, the hub 12 begins to rotate along with the shaft 16. The bearings 18 facilitate the rotation of the shaft 16.

Discs or a disc stack (not shown) that are placed upon hub are caused to rotate as the hub 12 rotates. A head (not shown) then reads and writes data to and from the discs.

Method of Making the First Embodiment

The spindle motor 10 shown in FIGS. 3 and 4 is made in part using an encapsulation technique. This encapsulation technique involves the following steps, and uses the mold shown in FIGS. 15 and 16. First, a mold is constructed to produce a part with desired geometry. The mold has two halves 72 and 74. Also, core pins 76 are connected to a plate 78 that is activated by hydraulic cylinders 77 within the mold tool. The stator 20 is placed within the mold and the two halves are closed. The core pins hold the stator 20 in its correct position. Second, using solid state process controlled injection molding, plastic is injected through gate 80 around the stator, so as to encapsulate the stator and form the body 14 shaped as shown in FIGS. 3 and 4. As plastic flows in, pins 76 are withdrawn so that the plastic completely surrounds the stator.

After the stator assembly is formed, the shaft 16 is press fit and possibly glued into the bearings. Next, glue is placed on the outer bearing surfaces and the bearings and shaft are press fit into the interior portion 30 of the plastic body 14. It may be desirable to mold the interior portion 30 smaller than necessary and drill it out after the molding step to fit the exact size of the bearings being used. Next the aluminum disc support member 12 is machined and the magnet and flux return ring are glued onto the lower surfaces. The disc support member 12 is then glued to the motor shaft.

After the spindle motor and hub are assembled they can be used to construct a hard disc drive by using the holes 25 to mount the motor to the base of the hard disc drive. Thereafter, construction of the hard disc drive can follow conventional methods.

Advantages of the First Embodiment

An advantageous feature of the first embodiment is provided by the fact that the body 14 is preferably a monolithic body 14 or monolithically formed using an encapsulation technique. This monolithic body 14 provides a single structure that aligns the stator, bearings, shaft and disc support member relative to one another. (Further this single piece provides support for the bearings and a base 22 that allows connection to a hard disc drive). The use of multiple parts in previous devices results in stack up tolerances and increased manufacturing costs. Conversely, the single unitized body of the present invention provides alignment for the components of a spindle motor and couples these components to one another. By encapsulating the body 14, and thereby molding some components as part of the body 14 and using the body to align the remaining components, stack up tolerances are substantially reduced, along with manufacturing costs. This also leads to greater motor efficiency and performance.

The disclosed spindle motor optimizes dimensional tolerances among motor components and thereby enables higher rotational speeds. The fact that the preferred body is made of thermoplastic allows the use of a type of thermoplastic with a CLTE similar to that of the steel bearing cases. This in turn facilitates optimal interference fits between bearings, such as hydrodynamic bearings and the motor body. In the past, such interference fits where difficult to achieve because of the difference in thermal expansion coefficients of the bearings and the component parts of the motor. As the motor heats up, and the bearings get hot, the bearing cases are put under stress as they try to expand. The bearing cases can even deflect, resulting in non-uniform rotation. This limited how close the data tracks could be spaced together.

Further, to prevent the motor from seizing when it got hot, larger than desired gaps between the magnet 28 and the stator 20 were used so that when pieces expanded from being heated, the magnet would not contact the stator. If the magnet contacted the stator, the contact would generate magnetic particulate which can damage the heads and interfere with their ability to read or record data on the discs. Also, if the body has a CLTE greater than that of the steel lamination in the stator, the gap has to be large enough so that the expansion of the body as the motor heats up does not cause the body to contact the rotating magnet (even though the steel laminations are not close to contacting the magnet). With the preferred embodiment of the present invention, with the CLTE of the body matching that of the steel laminations, much smaller gaps, as low as 0.005 inches and more preferably as low as 0.003 inches, can be utilized. As the body expands, it only expands at the same rate as the laminations, and does not grow to the point that the body diminishes the gap size to zero. Thus, the only gap that is needed is one sufficient for expansion of the steel laminations. These smaller gaps make the motor more efficient, as the electrical efficiency of the motor decreases with larger distances between the stator and the rotating magnet.

Through the use of the present embodiment, a particular plastic may be chosen for the body 14 that has properties of rockwell hardness, flex modulus, and elongation that are specifically designed to counteract the vibratory frequencies generated by the motor. Thus, the disclosed spindle motor substantially reduces motor vibration. This reduced vibration allows information on a disc to be stored closer together, thereby enabling higher data density.

As discussed above, controlling heat dissipation in conventional spindle motors is difficult to achieve. A particular plastic may be chosen for encapsulating the body 14 that is designed to facilitate heat dissipation. By putting this material in intimate contact with the two heat sources (motor windings and bearing) and then creating a solid thermal conductive pathway to the housing of the drive, overall motor temperature may be reduced. Moreover, heat sinks may be conveniently encapsulated within the body 14 during the molding process. These heat sinks may consist of metal inserts, which are discussed in greater detail below. The fact that these inserts are encapsulated within the body, as opposed to being separately attached, simplifies the manufacturing process and allows for post machining to enable more precise tolerances and ensures that dimensional consistency will be maintained over the motors life.

The disclosed spindle motor also reduces the emission of materials from the motor components onto the magnetic media or heads of the disc drive. This is achieved because components such as the stator, which potentially emit such materials, are substantially encapsulated in plastic. Further materials such as glue used to attach components together are eliminated through the use of a monolithic body 14.

In addition, the disclosed spindle motor obviates the necessity of a separate plastic or rubber ring sometimes used to isolate the spindle motor from the hard drive in order to prevent shorts from being transferred to the magnetic media and ultimately the read-write heads. Because the disclosed spindle motor body 14 is preferably made of a non-electrically conductive (having a dielectric strength of at least 250 volts/mil) and injectable thermoplastic material, such a separate rubber isolating ring is unnecessary. Once again this reduces manufacturing costs and the stack up tolerances associated with using an additional part.

Second Embodiment

Referring to FIGS. 5–6, a second embodiment of the spindle motor 110 is shown. This embodiment is similar to the embodiment shown in FIGS. 2–4 and like components are labeled with similar reference numerals with an addend of 100. A monolithic body 114 is formed by an encapsulation method. The primary difference between the first embodiment and the second embodiment is that in the second embodiment, the magnet 128 is concentrically surrounded by the stator 120 when the motor 110 is assembled, as opposed to the first embodiment where the stator 20 surrounds the magnet 28. Also, in order to achieve this positioning, the body 114 is shaped differently. Referring to FIG. 6, the body 114 is shaped such that the portion of the body 114 containing the stator 120 concentrically surrounds the portion of the body surrounding the shaft 116, and a gap 160 is formed between these two portions. The poles on the core are salient poles, but are directed inwardly. Further, in accordance with this positioning, the magnet 128 is positioned on an outer portion of the hub and the flux return ring 158 is positioned interior to the magnet 128.

In the embodiment shown in FIGS. 5–6 a hydrodynamic bearing 118 is used. Hydrodynamic bearings can be an air bearings. The fluid used in hydrodynamic bearings can be either a liquid or gas. The bearing 118 concentrically surrounds a substantial portion of the shaft. Alternatively, ball bearings such as the ones shown in the first embodiment could be used in the second embodiment. Finally, in the second embodiment the inner portion 130 of the body 114 does not extend through the entire length of the body 114, although in an alternate embodiment it could. The second embodiment may be made and used in a similar manner as the first embodiment. This embodiment has the advantages discussed above in conjunction with the first embodiment. The use of a hydrodynamic bearing is possible because there is less stress on the bearing case, as well as the fact that this motor is easier to assemble. The use of a hydrodynamic bearings provides less friction, less wear resistance and hence a longer bearing life, less vibration and the capability to operate at higher speeds.

Third Embodiment

Referring to FIG. 7 a third embodiment of a spindle motor is shown. This embodiment is similar to the embodiment shown in FIGS. 5–6 and like components are labeled with similar numerals with an addend of 200. A monolithic body 214 is formed by an encapsulation method. In the third embodiment, the hub 212 is made of steel so that the flux return ring 258, which must be of a material that will propagate magnetic energy, can be made as an extension of the rest of the hub. The magnet 228 is fixed to the flux return ring 258.

The third embodiment demonstrates the use of inserts. In general, the term "insert" is used to describe any component other than the elements of the stator that are substantially encapsulated in the phase change material with the stator. Different inserts may be used to provide different benefits. The inserts may be used to provide structural rigidity, thermal conductivity, vibration dampening or enhanced magnetic effect. The inserts may themselves be magnetic. These second magnets can be enhancement magnets, which are directly involved with the electromechanical functioning of the motor, or can be parts of a magnetic bearing (described in more detail below). The inserts may enhance heat transfer away from the bearing and stator. The inserts may enhance dampening of motor vibration. This may reduce audible noise as well as improve motor life and allow for closer data track spacing.

In the embodiment of FIG. 7, there are two inserts. Specifically, a central insert 260 is molded within the upper portion 240 of the body 214. The central insert 260 is molded concentrically with respect to the upper portion 240. A base insert 262 is molded within the base 222 portion of the body 214. The central insert 260 and the base insert 262 serve to enhance the stiffness of the body 214. These inserts also improve the overall thermal conductivity of the body 214, and thereby improve motor performance. The inserts may also be used in combination with the encapsulant to dampen unwanted vibrations or audible noise. The plastic body 214 locks the inserts into position with a high degree of strength. These inserts may be entirely overmolded by plastic or alternatively portions of these inserts may be exposed. The third embodiment may be made and used in a similar manner as the first embodiment. This embodiment has the advantages discussed above in conjunction with the first embodiment, as well as the advantage from the use of inserts 260 and 262.

Fourth Embodiment

Figure 8:
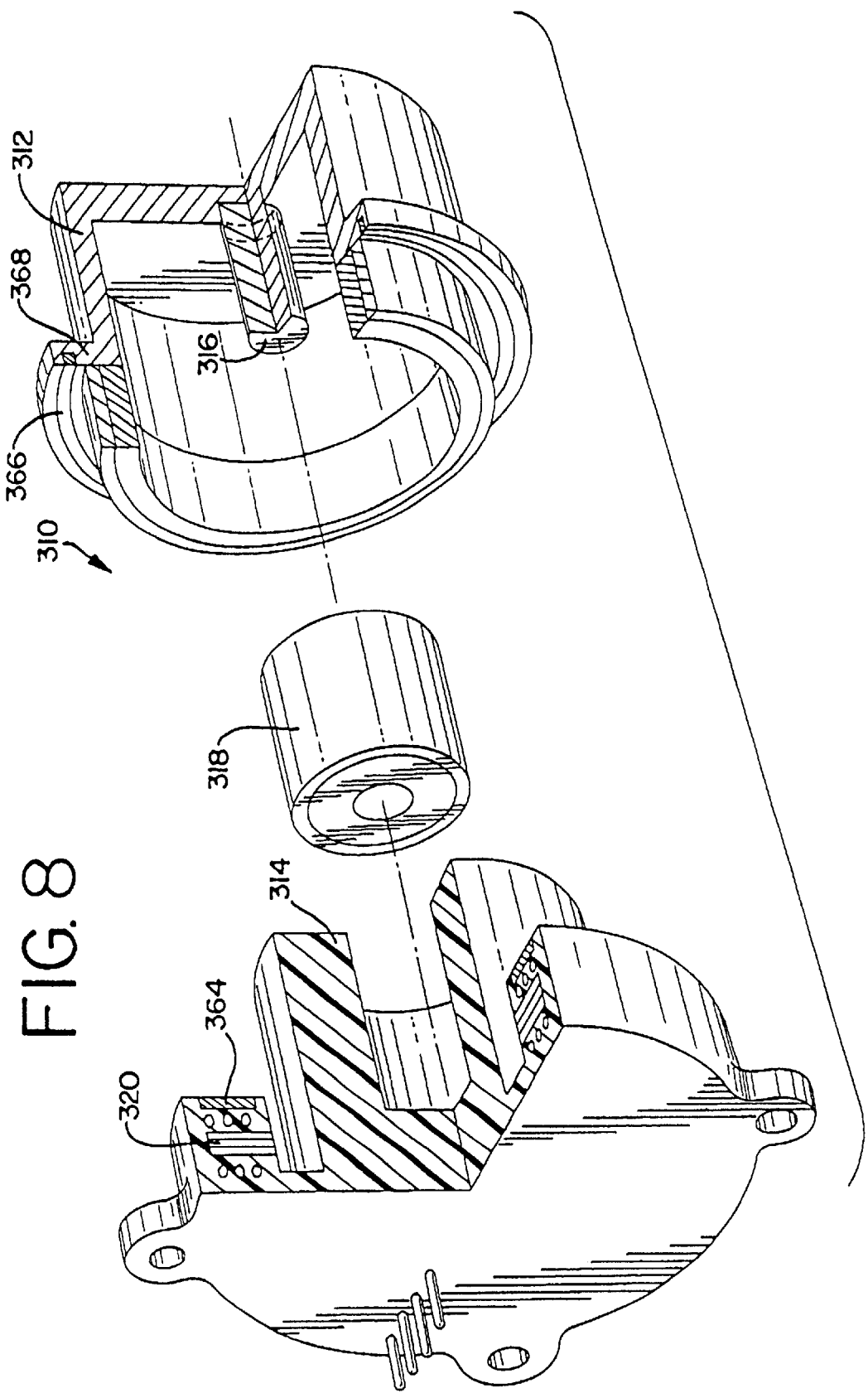
FIG. 8 is an exploded, partial cross-sectional and perspective view of a high speed motor in accordance with a fourth embodiment of the present invention.

A fourth embodiment of the spindle motor is shown in FIG. 8. The spindle motor 310 includes components that are similar to the previous embodiments, in particular the second embodiment, shown in FIGS. 5–6. A monolithic body 314 is formed using an encapsulation method. The primary difference between the fourth embodiment and the second embodiment is that the fourth embodiment includes magnetic bearings, one part of which constitutes an insert. Referring to FIG. 8 a first portion of the magnetic bearing 364 is substantially encapsulated by being insert molded into the body 314 at a position above the stator 320. A second opposing portion of the magnetic bearing 366 is attached to the hub of a flange portion 368 of the disc support member 312. The second portion of the magnetic bearing 366 is attached to the flange portion 368 by glue. The first magnetic bearing portion 364 and the second magnetic bearing portion 366 are used in conjunction with a hydrodynamic bearing to create a working gap inside the hydrodynamic bearing 318 so that there is no wear from start up conditions. The body 314 can be molded or the body and/or magnet later machined to provide precise tolerance between the first and second portions of the magnetic bearing. An advantage of the present invention is obtained by the fact that the first portion of the magnetic bearing is substantially encapsulated by the plastic of the body. The first portion may initially be completely encapsulated and the body machined to expose a surface of the magnet. Encapsulating the first portion 364 facilitates machining of the magnetic bearings and the cleaning of any magnetic debris generated by such machining. The fourth embodiment may be made and used in a similar manner as the first embodiment. This embodiment has the advantages discussed above in conjunction with the first embodiment as well as the advantage that comes from using a magnetic bearing.

Fifth Embodiment

Referring to FIG. 9, a fifth embodiment of the spindle motor 410 is shown. The fifth embodiment includes components that are similar to the previous embodiments, in particular to the first embodiment. A monolithic body 414 is formed using an encapsulation method. The primary difference between the fifth embodiment and the first embodiment is that the fifth embodiment also includes an insert 468. The insert 468 is preferably annular shaped and is positioned in between the bearings 418 and the interior portion 430 of the body 414. The insert 468 is encapsulated at the same time as the stator 420 and the plastic tightly retains and precisely positions the insert 468 relative to the stator. The insert 468 is preferably made of stainless steel. The insert 468 serves to increase the overall strength and stiffness of the body 414. Also, the insert 468 improves the thermal conductivity of the body 414. It also eliminates differences in CLTE with the bearing materials. It also is easier to glue to the steel bearing materials (gluing similar materials is easier than dissimilar materials). Additional inserts, such as the base insert discussed above, could be added in this embodiment. The fifth embodiment may be made and used in a manner similar to the first embodiment. This embodiment has the advantages discussed above in conjunction with the first and third embodiments.

Sixth Embodiment

Referring to FIG. 10, a sixth embodiment of the spindle motor 510 is shown. A monolithic body 514 is formed using an encapsulation method. This embodiment includes components that are similar to those shown in previous embodiments, in particular to the first embodiment. However, instead of having a shaft 16 that is attached with the disc support member 12 and rotates along therewith, like the first embodiment, the sixth embodiment has a shaft 516 that is fixed relative to the thermoplastic body 514 and hence is fixed relative to the stator assembly. The bearing 518 is located intermediate the disc support member 512 and the shaft 516. The disc support member 512 includes an inner portion 513 and an outer portion 515. The inner portion 513 is concentrically disposed between the interior portion 530 of the body 514 and the bearings 518. In operation, the bearings generally ride along the inner portion 513 of the disc support member 512 and the fixed shaft 516 does not move with respect to the body 514. In this embodiment the shaft 516 may be lengthened so that it can be fixed to the hard disc drive case (not shown). This configuration serves to provide increased motor stiffness and to simplify construction of the hub and assembly into the motor. Comparing the first and sixth embodiments, it can be seen that in the present invention either the shaft or the bearing can be fixed to the stator assembly, and the other of the shaft and bearing can be fixed to the rotatable hub. In the first embodiment the bearing is fixed to the stator assembly. In the sixth embodiment the shaft is fixed to the stator assembly, preferably by being molded with the stator in the body.

The sixth embodiment may be made in a similar manner as the first embodiment, except that the shaft may be included in the mold with the stator, or can be attached to the body 514 later. This embodiment has the advantages discussed above in conjunction with the first embodiment.

Seventh Embodiment

Figure 12:
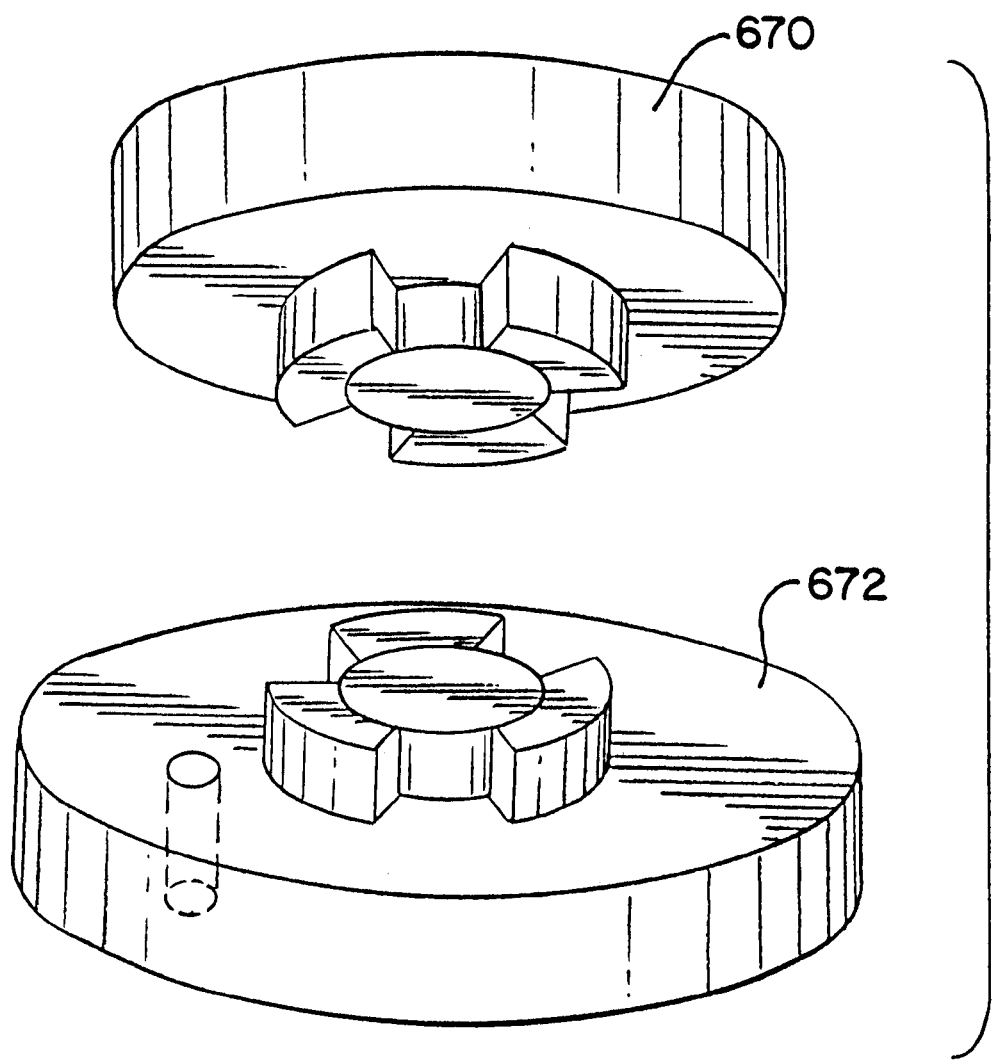
FIG. 12 is a perspective view of the inserts used in the high speed motor of FIG. 11.

Referring to FIG. 11, a seventh embodiment of the spindle motor 610 is shown. This embodiment includes similar components as the previous embodiments and in particular to the first embodiment. A monolithic body 614 is formed using an encapsulation method. The primary difference between this embodiment and the first embodiment is that the bearings 618 are spaced a substantially greater distance apart from the shaft 616 than the bearings 18 in the first embodiment. This spacing is achieved using an upper insert 670 and a lower insert 672 substantially encapsulated by the body 614 (FIG. 12). These inserts are preferably annular shaped, and act as extensions of the shaft 616. The upper insert 670 and the lower insert 672 are preferably made of aluminum. The upper insert 670 and the lower insert 672 are positioned between the bearings 618 and the shaft 616. The bearings are then attached by glue. In this embodiment, the shaft 616 is fixed to the body 614, partially by being fixed to the inserts. The shaft extends from the base 622 so that it can be fixed to the base of the hard disc drive. The seventh embodiment may be made and used in a similar manner as the first embodiment. This embodiment has the advantages discussed above in conjunction with the first embodiment. An additional advantage of this embodiment is that oversized bearings (having an outer diameter greater than 13 mm) may be used. These larger bearings generally have a longer life and can be run at higher speeds for longer periods of time. These larger bearings more effectively dissipate heat from the bearing surface.

Another major advantage of this embodiment stems from the lower bearing being positioned on the lower section of the hub. This arrangement dramatically increases stiffness and reduces disc wobble during rotation. This in turn allows the use of enhanced data track density. The inserts 670 and 672 also provide stiffness and are thermally conductive to dissipate heat.

Another advantage is that the manufacturing process to make the hub shown in this embodiment is significantly less complex and costly. The hub is made from steel instead of aluminum, which eliminates the need for a separate flux return ring. In essence the sidewall of the hub where the magnet 628 is attached act as the flux return ring.

In a less preferred embodiment of FIG. 11, instead of using the lower insert 672, the oversized lower bearing 618 could be supported by just having the body 614 of a large diameter at that point. In that instance the body would be acting as an extension of the shaft. Alternatively, a shaft could be created that had one large flange on one end used to support the oversized bearing, and then the stator core lamination could be placed over the rest of the shaft and an insert like top insert 670 fixed to the top of the shaft, and all of this structure placed in a mold to encapsulate the stator and shaft.

Eighth Embodiment

An eighth embodiment of the spindle motor is shown in FIG. 13. This embodiment, referred to as a pancake motor, includes a monolithic body 714 formed from an encapsulation method. The monolithic body substantially encapsulates a circuit board 721. Copper traces (not shown) are placed on the circuit board and serve as the conductors that create a plurality of magnetic fields. However, no steel core is used in this type of stator. An IC chip controls current through these copper traces. Passing current through the traces generates magnetic fields which cooperate with fields in permanent magnet 728 attached to a disc support member 712 to rotate the permanent magnet 728 and thereby rotate the disc support member 712. This embodiment has the advantages discussed above in conjunction with the first embodiment. The circuit board is preferably a multilevel circuit board.

Ninth Embodiment

A ninth embodiment of the spindle motor 810 is shown in FIG. 14. This embodiment is somewhat similar to the first embodiment. A monolithic body 814 is formed using an encapsulation method. The primary difference between the ninth and first embodiments is that in the ninth embodiment a magnet 828 is not fixed to the hub 812. Instead, the magnet 828 is disposed around the shaft 816 and press fit, glued or welded and extends substantially along the length of the shaft. Further in this embodiment, the stator 820 contains a greater number of laminations. In addition, the body 814 is monolithic and contains an upper support portion 842 and a lower support portion 844 that are adjacent the upper bearing 846 and the lower bearing respectfully 848. Further, the shaft 816 is attached to the hub 812.

In this embodiment, the shaft 816 acts as the flux return for the magnet 828. While not shown, it should be apparent that the present invention is applicable to yet other embodiments of high speed motors. When the stator is energized, it causes the permanent magnet and shaft to rotate, which in turn causes the hub to rotate. In this embodiment the magnet is connected to the hub by being fixed to the shaft which in turn is fixed to the hub.

Tenth Embodiment

Figure 17:
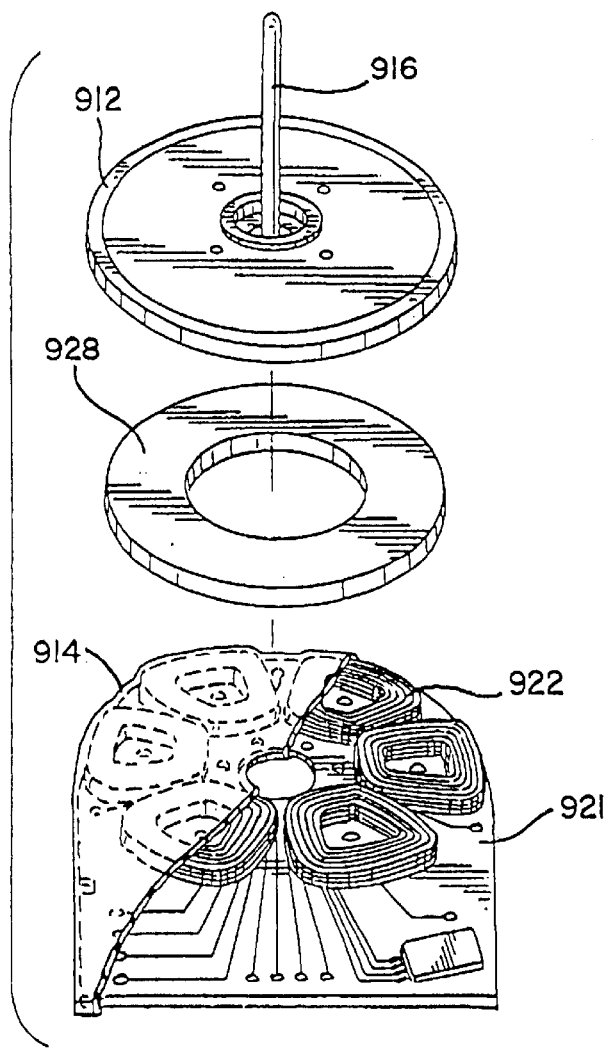
FIG. 17 is an exploded and partial cross sectional view of components used in a pancake motor, a tenth embodiment of the invention.

A tenth embodiment, another pancake motor and a variation of the eighth embodiment, is shown in part in FIG. 17. This embodiment uses conductors of copper wire shaped in the form of coils 922 placed upon the circuit board 921, instead of copper traces. The magnet 928 is fixed to the bottom of the hub 912, but is shown in exploded form to facilitate illustration. Thermoplastic material is used to encapsulate the circuit board and form body 914. Bearings (not shown) can be fixed to the body 914.

Eleventh Embodiment

Figure 18:
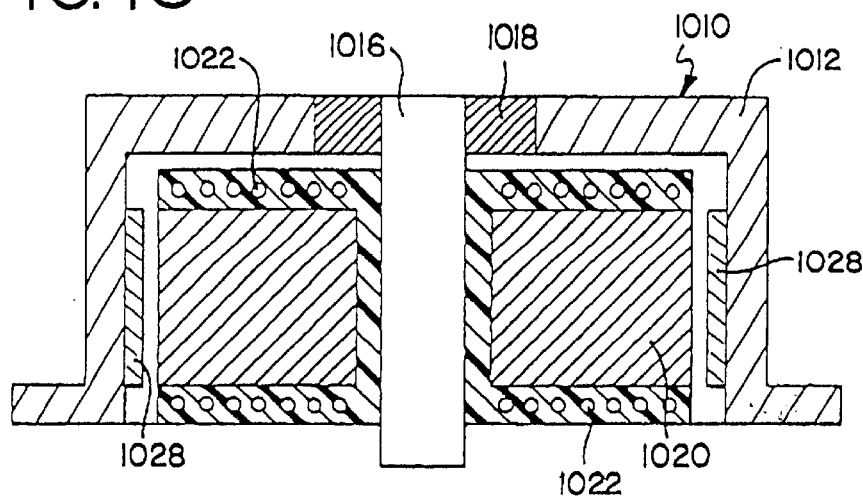
FIG. 18 is a cross-sectional view of a high speed motor in accordance with an eleventh embodiment of the invention.

An eleventh embodiment of a motor 1010 of the present invention uses a stator and shaft that are connected together by the phase change material, as shown in FIG. 18. The windings 1022 and remainder of stator 1020 are encapsulated, and the phase change material also encapsulates a central portion of the shaft 1016. The bearing 1018 is then attached to an exposed top portion of the shaft. The bottom portion of the shaft extends below the stator so that it can be attached to the base of the hard disc drive. The shaft is thus used as the mounting structure to hold the motor 1010 to the hard disc drive housing. The hub 1012 includes a magnet 1028. One of the advantages of this embodiment is that the alignment between the shaft 1016 and stator 1020 can be set by the phase change material, and the shaft does not have to be separately glued in place.

Twelfth Embodiment

Figure 19:
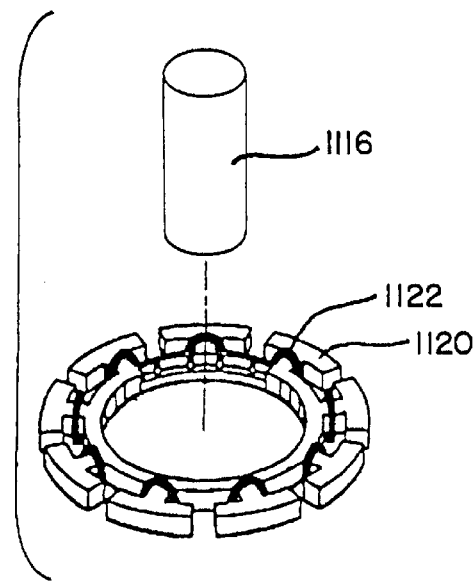
FIG. 19 is a perspective view of a stator and shaft used in a twelfth embodiment of the present invention.
Figure 20:
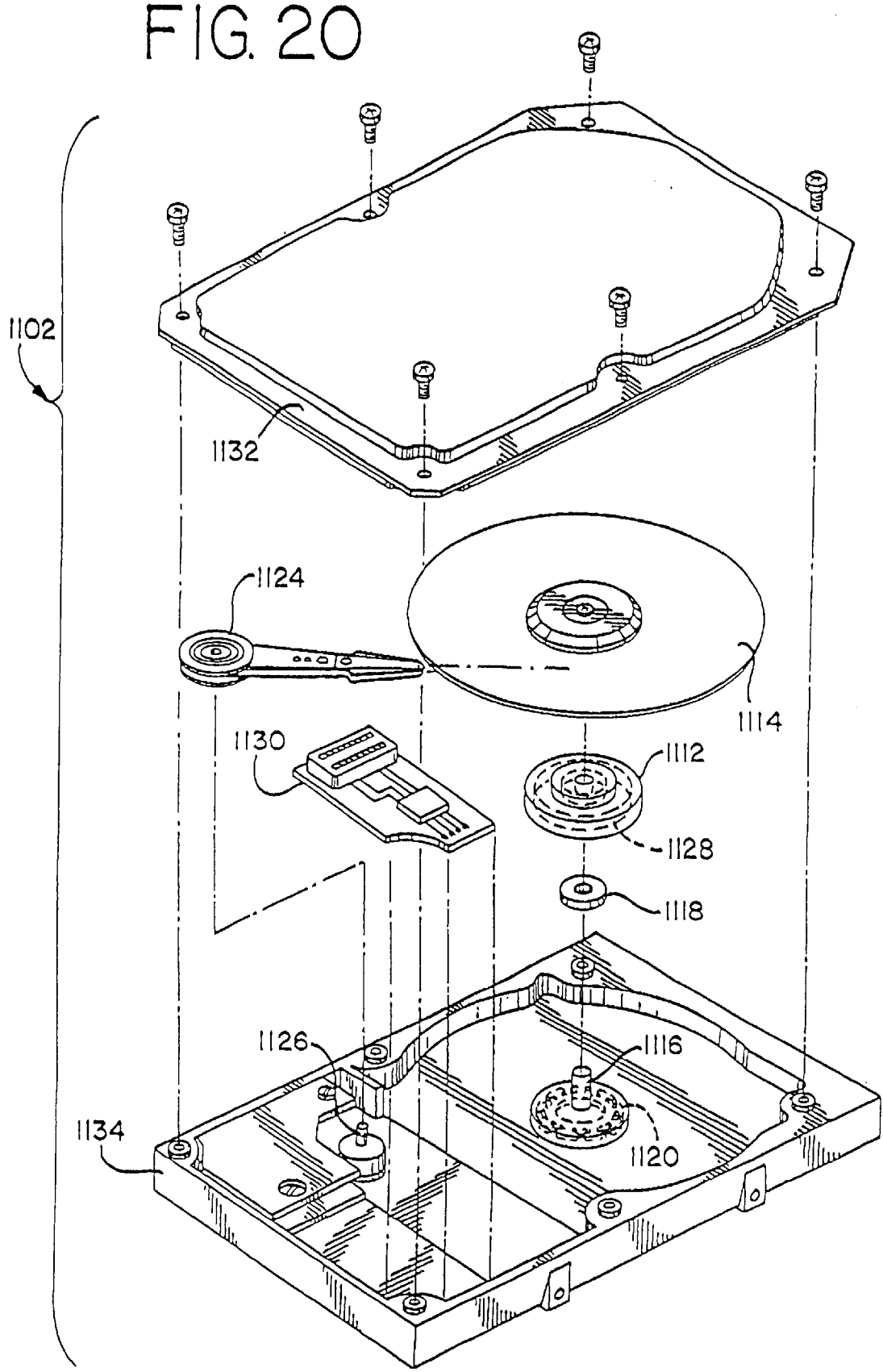
FIG. 20 is an exploded and partial cross sectional view of a hard disc drive of the present invention.

A twelfth embodiment of the invention is a hard disc drive 1102 shown in FIGS. 19 and 20. The motors of the previous embodiment were designed to be manufactured separately and attached to the base or other housing components of a hard disc drive. In this embodiment, the base 1134 of the hard disc drive is made as part of an assembly that also substantially encapsulates the stator 1120.

The stator 1120 with windings 1122 and shaft 1116 (FIG. 19) are preferably included into the base assembly 1134 (FIG. 20) when the body of phase change material is formed, such as by injection molding. Of course, the shaft 1116 could be added to the base assembly afterwards. Preferably, the body of phase change material is a monolithic body of thermoplastic material. The base assembly also preferably includes a second shaft 1126 supported by the body of phase change material. This second shaft 1126 is used to support the read/write head 1124 in operable proximity to one or more discs 1114 supported on hub 1112. The hub 1112 has a magnet 1128 connected thereto which is located in operable proximity to the stator 1120 when the hub is rotatably supported by bearing 1118 on shaft 1116. The hard disc drive 1102 preferably includes other components, such as a circuit board 1130, wiring, etc. that is commonly used in hard disc drives and therefore not further described. Of course, a cover 1132 is preferably included and attached to the base assembly by conventional methods. The cover and the base assembly cooperate to form a housing for the hard disc drive 1102.

One advantage of this embodiment of the invention is that the motor is built directly onto the base assembly, reducing the number of parts. Further, the other components of the hard disc drive can be aligned with the motor and disc or discs supported thereon.

Method of Developing a High Speed Motor

The present invention is also directed to a method of developing a high speed motor. In an exemplary embodiment the high speed motor includes a stator having conductors and the stator is substantially encapsulated in a body of phase change material. It has been found that using this basic design concept, high speed motors can be developed and quickly optimized to meet various applications. Also, it has been found that when the motors include inserts, the development process includes another degree of freedom in design. There are several basic design parameters that can be varied when developing a motor according to the present invention: a) the composition (and thus characteristics) of the phase change material; b) the configuration of the body of phase change material; c) the use and dimensions and stiffness properties of inserts; d) the magnetic design of the motor (the windings, core shape, etc.); and e) the shape, size and configuration of the hub (and any discs used thereon when the motor is for a hard drive).

In a first embodiment, where a motor is developed for a hard disc drive, the method includes the following steps: a) providing a stator having multiple conductors that create a plurality of magnetic fields when electrical current is conducted through the conductors, the stator being substantially encapsulated within a body of first phase change material; b) assembling the stator with a bearing, shaft, hub and discs to construct a disc drive; c) energizing the stator and rotating the hub and discs in a manner that generates vibrations, and measuring the frequency of the vibrations; d) designing a second phase change material that dampens the vibrations generated by energizing the stator in step c); and e) repeating steps a)–c), substituting the second phase change material for the first phase change material. At least one of the flex modulus, elongation and surface hardness properties of the phase change material will be adjusted between the first and second phase change materials to optimize vibration dampening. The phase change material is preferably a thermoplastic. The advantages of this method of developing a high speed motor is that the above-identified properties of the plastic may be adjusted to meet the vibration dampening needs of a variety of different motor types and configurations. The reduced vibration will improve motor performance and can reduce audible noise generation.

It is also possible to change the configuration of the body so that it will result in reduced harmonic oscillations and thus vibrations. In this embodiment, the method includes the steps of a) providing a stator having multiple conductors that create a plurality of magnetic fields when electrical current is conducted through the conductors, the stator being substantially encapsulated within a body of phase change material having a first configuration; b) assembling the stator with a bearing, shaft, hub and discs to construct a disc drive; c) energizing the stator and rotating the hub and discs in a manner that generates vibrations, and measuring the frequency of the vibrations; and d) reconfiguring the shape of the phase change material to a second configuration and repeating steps a)–c), substituting the phase change material having the second configuration for the phase change material having the first configuration. In this embodiment, the configuration of the body of phase change material is adjusted to optimize vibration dampening. Where the body has a bore, a wall thickness and a flange as shown in FIGS. 5, 7 and 8, the bore length, wall thickness and flange width are design parameters that can be modified between the first and second configurations. Of course, other dimensions of body components can also be used. In this aspect of the invention, reconfiguring the shape of the phase change material would also include adding such elements as a flange, grooves, etc., or even adopting a relatively different overall shape.

When a stator assembly is designed that has phase change material encapsulating the conductors, it is also possible to incorporate metal inserts into the stator assembly, and the shape, size or stiffness of those inserts can be selected and/or designed so as to dampen unwanted harmonics. In this embodiment, the method of developing a high speed motor uses the steps of a) providing a stator having multiple conductors that create a plurality of magnetic fields when electrical current is conducted through the conductors, the stator being substantially encapsulated within a body of phase change material; b) assembling the stator with a bearing, shaft, hub and discs to construct a disc drive; c) energizing the stator and rotating the hub and discs in a manner that generates vibrations, and measuring the frequency of the vibrations; d) including a metal insert substantially encapsulated within the body of phase change material; e) repeating steps a)–d) and adjusting at least one of the stiffness and thickness of the insert so as to optimize vibration dampening.

Another embodiment of the invention of developing high speed motor involves the steps of a) providing a stator having multiple conductors that create a plurality of magnetic fields when electrical current is conducted through the conductors, the stator being substantially encapsulated within a body of phase change material; b) assembling the stator with a bearing, shaft, hub and discs to construct a disc drive; c) energizing the stator and rotating the hub and discs in a manner that generates vibrations, and measuring the frequency of the vibrations; and d) modifying of the hub, the discs or both so that the disc drive has vibrations at frequencies of harmonic oscillation that are dampened by the phase change material.

Of course combinations of these four methods may also be used, such as varying both the characteristics of the phase change material and adding an insert to the body. Also, if the motor is to be used in a device other than a hard disc drive, it can be developed in the same manner, except that a gear, pulley, rim, fan blade or whatever other component is to be turned by the motor can be put on the motor instead of the hub and discs before the motor is energized.

The present invention is also directed to an alternative method of developing a high speed motor. Like the other methods, this method also involves a high speed motor that includes a body that is comprised of a phase change material that substantially encapsulates a stator. The high speed motor includes one or more, and generally a plurality of solid parts to be used in the motor either near or within the body, such as bearings and inserts. In addition, there are solid parts that are near the body, such as a disc support member and a hard disc drive base. The method of developing the high speed motor comprises designing a phase change material to have a coefficient of linear thermal expansion such that the phase change material contracts and expands at approximately the same rate as the one or more solid parts. For example, the preferred phase change material should have a CLTE of between 70% and 130% of the CLTE of the core of the stator. The phase change material should have a CLTE that is intermediate the maximum and minimum CLTE of the solid parts where the body is in contact with different materials. Also, the CLTE's of the body and solid part(s) should match throughout the temperature range of the motor during its operation. An advantage of this method is that a more accurate tolerance may be achieved between the body and the solid parts because the CLTE of the body matches the CLTE of the solid parts more closely.

Most often the solid parts will be metal, and most frequently steel, copper and aluminum. The solid parts could also include ceramics. In almost all motors there will be metal bearings. Thus a common element of this aspect of the invention is developing a motor by designing the phase change material to have a CLTE approximately the same as that of the metal used to make the bearings.

Most thermoplastic materials have a relatively high CLTE. Some thermoplastic materials may have a CLTE at low temperatures that is similar to the CLTE of metal.

However, at higher temperatures the CLTE does not match that of the metal. A preferred thermoplastic material will have a CLTE of less than $2\times10^{-5}$ in/in ° F., more preferably less than $1.5\times10^{-5}$ in/in ° F., throughout the expected operating temperature of the motor, and preferably throughout the range of 0–250° F. Most preferably, the CLTE will be between about $0.8\times10^{-5}$ in/in ° F. and about $1.2\times10^{-5}$ in/in ° F. throughout the range of 0–250° F. (When the measured CLTE of a material depends on the direction of measurement, the relevant CLTE for purposes of defining the present invention is the CLTE in the direction in which the CLTE is lowest.)

The CLTE of common solid parts used in a motor are as follows:

|  | 23° C. | 250° F. |
|---|---|---|
| Steel | 0.5 | 0.8 ($\times10^{-5}$ in/in ° F.) |
| Aluminum | 0.8 | 1.4 |
| Ceramic | 0.3 | 0.4 |

Of course, if the motor is designed with two or more different solids, such as steel and aluminum components, the CLTE of the phase change material would preferably be one that was intermediate the maximum CLTE and the minimum CLTE of the different solids, such as 0.65 in/in ° F. at room temperature and $1.1\times10^{-5}$ in/in ° F. at 250° F.

One preferred thermoplastic material, Konduit OTF-212-11, was made into a thermoplastic body and tested for its coefficient of linear thermal expansion by a standard ASTM test method. It was found to have a CLTE in the range of −30 to 30° C. of $1.09\times10^{-5}$ in/in ° F. in the X direction and $1.26\times10^{-5}$ in/in ° F. in both the Y and Z directions, and a CLTE in the range of 100 to 240° C. of $1.28\times10^{-5}$ in/in ° F. in the X direction and $3.16\times10^{-5}$ in/in ° F. in both the Y and Z directions. (Hence, the relevant CLTEs for purposes of defining the invention are $1.09\times10^{-5}$ in/in ° F. and $1.28\times10^{-5}$ in/in ° F.) Another similar material, Konduit PDX -0-988, was found to have a CLTE in the range of −30 to 30° C. of $1.1\times10^{-5}$ in/in ° F. in the X direction and $1.46\times10^{-5}$ in/in ° F. in both the Y and Z directions, and a CLTE in the range of 100 to 240° C. of $1.16\times10^{-5}$ in/in ° F. in the X direction and $3.4\times10^{-5}$ in/in ° F. in both the Y and Z directions. By contrast, a PBS type polymer, (Fortron 4665) was likewise tested. While it had a low CLTE in the range of −30 to 30° C. ($1.05\times10^{-5}$ in/in ° F. in the X direction and $1.33\times10^{-5}$ in/in ° F. in both the Y and Z directions), it had a much higher CLTE in the range of 100 to 240° C. ($1.94\times10^{-5}$ in/in ° F. in the X direction and $4.17\times10^{-5}$ in/in ° F. in both the Y and Z directions).

In addition to having a desirable CLTE, the preferred phase change material will also have a high thermal conductivity. A preferred thermoplastic material will have a thermal conductivity of at least 0.7 watts/meter° K. using ASTM test procedure 0149 and tested at room temperature (23° C.).

Stator assemblies with a body of phase change material partially encapsulating the stator wherein the phase change material has the CLTE or thermal conductivity as described above are themselves novel and define another aspect of the present invention. Once encapsulated, the stator assembly will preferably be able to meet disc drive manufacturers' industry standards for particulate emission, requiring that when tested the parts will produce 10 or fewer particles of 0.3 micron and larger per cubic foot of air. This is primarily because machined mounting plates are eliminated and other sources of particulates (steel laminations, wound wire and wire/terminal connections) are sealed in the encapsulation.

Also, the encapsulation reduces outgassing because varnish used to insulate wire in the windings and epoxy used to prevent steel laminations from oxidizing are hermetically sealed inside the stator assembly. Also, with fewer parts there is less glue needed to hold parts together. This reduced outgassing reduces the amount of material that could effect the magnetic media or heads used in the disc drive.

Another aspect of the invention utilizes the basic motor described above that has dampened vibrations to make a hard disc drive. The dampened vibrations can be either in the audible frequency range, thus resulting in a disc drive with less audible noise, or in other frequencies. As mentioned earlier, the degree to which data can be packed onto a hard drive is dependent on how close the data tracks are spaced. Due to reduced vibrations resulting from aspects of the present invention, the data tracks can be more closely spaced and the hard drive still operated.

The vibrations of concern are generally produced by harmonic oscillations. The phase change material can be selected so as to dampen oscillations at the harmonic frequency generated by operation of the motor, many of which are dependent on the configuration of the windings or other conductors. Thus, in one aspect, the invention is a motor and disc assembly wherein the motor comprises a stator having multiple conductors that create a plurality of magnetic fields when electrical current is conducted through the conductors and a monolithic body of phase change material substantially encapsulating the conductors. In this respect, the phase change material has a vibration dampening effect so that the motor and disc assembly has a reduction of harmonic oscillations.

There are a number of properties of the phase change material that can be varied in a way that will allow the phase change material to dampen different harmonic frequencies. This includes adding or varying the amount of glass, Kevlar, carbon or other fibers in the material; adding or varying the amount of ceramic filler in the material; changing the type of material, such as from polyphenyl sulfide to nylon or other liquid crystal polymers or aromatic polyesters, adding or grafting elastomers into a polymer used as the phase change material; and using a different molecular weight when the phase change material is a polymer. Any change that affects the flex modulus, elongation or surface hardness properties of the phase change material will also affect its vibration dampening characteristics.

One way to determine the effectiveness of vibration dampening, and thus to select a suitable material, is to make up motor configurations where different phase change materials are used, and then measure the vibration dampening accomplished by each material. The vibration dampening can be measured with a capacitance probe or laser Doppler vibrometer. In the range of 200–2000 Hz, and preferably in the range of 300–2000 Hz, the disc drives using high speed motors of the present invention will preferably have an amplitude decrease of harmonic vibration of at least 5 and more preferably at least 10 decibels. In the audible range, 20–15,000 Hz, the dampening will preferably be at least 2, more preferably at least 5 decibels in reduction in harmonic frequency amplitude. These reductions are assessed based on a comparison of the vibrations of the same motor but without the stator being encapsulated.

The reduced vibrations thus allow for a unique hard disc drive with high data density and method of manufacturing the same. In this aspect of the invention, a spindle motor is constructed with reduced vibration characteristics. The motor includes a stator assembly with a stator substantially encapsulated in a body of phase change material, a rotatable disc support member having a magnet connected thereto, a shaft, a bearing surrounding the shaft and either the shaft or bearing being fixed to the stator assembly and the other of the shaft or bearing being fixed to the disc support member. The spindle motor is built into a hard disc drive with a magnetic storage media on the disc support. The reduced vibration characteristics of the motor is taken advantage of by having close data tracks on the magnetic storage media. Preferably the data tracks are spaced so as to have at least 10,000 tracks/inch.

The vibration dampening ability of the phase change material may also be used in another aspect of the invention, a hard disc drive having a high speed spindle motor with improved shock resistance. In this aspect of the invention, the body of phase change material is shock absorbing and is attached to the housing of a hard disc drive. The vibration dampening minimizes the transfer of energy between the housing of a hard disc drive and the magnetic storage media.

One difficulty encountered in hard disc drive manufacturing is that the various components used to make the motor often have particulates that must be ultrasonically cleaned off of the parts before they are assembled, and thereafter the assembly operation has to be carried out in a clean room environment. For example, when a stator is made, the steel core pieces that are laminated together and the wire used to make the windings are prone to have small particulates associated with them that must be removed. The particles are removed from the laminations before the windings are applied, because expensive and time consuming cleaning techniques would be required to clean the stator after it was built if the parts were not pre-cleaned. Even then, as the motor is assembled, it is possible for varnish on the windings to come off, or other particles to be generated when pieces of the motor strike one another.

One of the aspects of the invention takes advantage of the elimination of these particles when the stator is encapsulated and the fact that the encapsulation makes the stator assembly durable so that low cost ultrasonic cleaning can be used. First, the stator laminations and windings do not need to be cleaned before they are encapsulated. Thereafter, once the stator assembly has been made and cleaned, it can be used to construct a hard disc drive without the need for a clean room environment. Thus, in this aspect, the invention involves the following steps: a) constructing a stator made of a laminated steel core and wire windings; b) substantially encapsulating the stator in a body of phase change material to form a stator assembly; c) ultrasonically cleaning the stator assembly; d) constructing the stator assembly with a bearing, shaft and hub to form a spindle motor; and e) constructing the spindle motor into a hard disc drive.

One unique aspect of the invention is that a variety of stators can be encapsulated in the same mold tool. For example, stators that vary with respect to one or more of their properties, such as their number of turns of wire, their number of poles, their diameter and/or their thickness, may still all fit within the same mold tool. As a result, a first variety of stator can be encapsulated by injection molding or otherwise adding a thermoplastic or other phase change material to the mold tool, and then using the first variety of stator, a bearing and a shaft to build a first variety of motor. Then, a second variety of stator can be encapsulated and used to build a second variety of motor using the same or different bearings and shaft. Not only does this reduce the number of mold tools that are needed, but the stator assemblies will have a final uniform size and shape, since the phase change material body will have the same dimensions for each. As a result, other components of the motor and the disc drives in which they are used, such as the housing, can be constant between different disc drives.

In addition to the above discussed embodiments, a similar structure, method of manufacture and method of developing a high speed motor can be employed in high speed motors used in other types of applications. For example, these high-speed motors could be used in CD, DVD players, videocassette systems, digital cameras and in robotic servomotors.

Following is a summary of some of the benefits of preferred embodiments of the invention.

The reduced vibration resulting from encapsulation of the stator, especially with a thermoplastic material that is designed to reduce vibration for a specific motor configuration, is beneficial in a number of respects. First, the hard disc can be designed to pack data more closely together. Preferably the hard disc drive will use data tracks compact enough that 10,000 data tracks per inch can be reliably accessed. With reduced vibration it is practical to use hydrodynamic bearings.

Also, with reduced vibration, there will be less friction and wear in the bearings, which results in less heat being generated by the motor, in turn resulting in longer motor and bearing life and more power from the motor. Utilizing aspects of the present invention it is possible to construct motors able to spin in hard disc drives at speeds over 5,000 rpm. A preferred motor will be able to spin at 7,500 rpm or greater, and a more preferred embodiment will be able to spin at 10,000 rpm or greater.

The present invention can be used with motors having laminated cores and wire windings. It can also be used on motors using a circuit board configuration or coils on a circuit board.

A number of ways to improve thermal conductivity are presented. First, the phase change material will itself provide some heat dissipation. Second, the phase change material can include additives that will enhance its thermal conductivity. Third, heat conductive inserts can be included in the motor. Fourth, the body of phase change material, by being in contact with a number of parts of the motor and/or disc drive, can act as a pathway for heat such that those other parts of the motor and/or disc drive can act as heat sinks. This improved thermal conductivity provides longer life to the electrical and bearing components of the motor, a higher power device, higher efficiency and lower current draw. If the motor is in a battery powered device, this will extend the battery life.

The invention makes it practical to use oversized bearings, which results in less vibration induced wear and lower temperature, as well as longer bearing life.

The unique motor design allows for unique manufacturing possibilities. The laminations and windings do not need to be separately cleaned and, once the stator assembly has been encapsulated, it will not generate contaminants. In addition, if inserts are encapsulated and then machined to provide precise dimensions, one cleaning step can be used after all fabrication steps. It is not practical to do this type of machining on assembled parts without the present invention because there is no practical way to clean the entire assembly after such a machining operation. Thus, hard disc drives can be constructed without the need for stringent "clean room" conditions. Only one ultrasonic cleaning step will be required. Cellular manufacturing technology can be used. The motor can be made anywhere and then cleaned just before being assembled with the hard drive. There is no need for costly packaging to keep the stator assembly clean. Also, the durability of the stator assembly allows for low cost shipping.

Hard drives built with the preferred motors will have better reliability from lower particulate levels and reduced outgassing. The hard drives will have improved shock resistance if the drive is dropped. The heads used in the hard disc drive are electrically isolated from the conductors in the motors without the need for a separate insulator. The preferred motors and disc drives will have quieter operation.

The use of an encapsulated stator allows the terminal connectors to be integrated into the body. In general, the motor can be more easily assembled and will include fewer parts. As noted above, the stack-up tolerances are reduced because the phase change material can be designed with a CLTE that closely approximates that of other motor components. By matching CLTE, one also obtains better environmental conditions. Otherwise, plastics get microcracks and moisture or other fluids can attack the encapsulated components.

There are a number of cost benefits associated with aspects of the present invention. There are cost benefits from fewer components. The die cast aluminum base 2 (see FIG. 1) and various insulators are replaced with one body of phase change material. The manufacturing process has reduced costs. Tools used to injection mold thermoplastics have a longer tool life than those used in die casting. There are lower costs because plastic molding tools produce more parts per hour than aluminum die casting tools. There are also lower costs because plastic parts require less post mold machining than aluminum parts.

There are also benefits associated with development time and cost for new motor configurations. Design implementation can be faster. First, since there are fewer parts, less parts have to be designed for each new motor. Second, fewer tools are needed, since fewer parts are required. Third, injection molding tools are modular in nature. This allows tooling to be easily customized without requiring a redesign of the whole tool. In many cases, one tool can be used for multiple product designs and iterations. For example, plastic molding tools might be able to be used with multiple winding configurations.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A stator assembly comprising
    a) a magnetically inducible core having a plurality of salient poles;
    b) a plurality of conductors comprising wire windings around said poles such that magnetic fields are induced in the core when electrical current is conducted through the conductors; and
    c) a body of a phase change material substantially encapsulating the core and the conductors, the phase change material having a coefficient of linear thermal expansion of between about $0.8 \times 10^{-5}$ in/in ° F. and about $1.5 \times 10^{-5}$ in/in ° F. throughout the range of 0–250° F.

2. The stator assembly of claim 1 wherein the phase change material has a coefficient of thermal conductivity of at least 0.7 watts/meter° K. at 23° C.

3. The stator assembly of claim 1 further comprising terminals for connecting the conductors to a power source, the terminals being partially encapsulated in the body.

4. The stator assembly of claim 1 further comprising one or more metal inserts molded into the body, the inserts providing one or more properties selected from the group consisting of increased rigidity, increased thermal conductivity, vibration dampening and enhanced magnetic effect.

5. The stator assembly of claim 1 wherein the core is made from steel laminations.

6. The stator assembly of claim 1 wherein the salient poles are directed outwardly.

7. The stator assembly of claim 1 wherein the salient poles are directed inwardly.

8. The stator of claim 1 wherein the phase change material includes ceramic particles.

9. The stator of claim 1 wherein the phase change material comprises polyphenyl sulfide.

10. A motor comprising the stator assembly of claim 1.

11. A stator assembly comprising:
    a) a stator having a magnetically inducible core with salient poles and multiple conductors that create a plurality of magnetic fields when electrical current is conducted through the conductors; and
    b) a body of phase change material substantially encapsulating the core and the conductors, the phase change material having a coefficient of linear thermal expansion of between about $0.8 \times 10^{-5}$ in/in °F. and about $1.5 \times 10^{-5}$ in/in °F. throughout the range of 0–250° F., a thermal conductivity of at least 0.7 watts/meter °K. and a dielectric strength of at least 250 volts/mil.

12. A stator assembly comprising:
    a) a stator having a core with salient poles and multiple conductors that create a plurality of magnetic fields when electrical current is conducted through the conductors; and
    b) a body of phase change material substantially encapsulating the conductors, the phase change material being an injection molded thermoplastic having a coefficient of linear thermal expansion of between about $0.8 \times 10^{-5}$ in/in °F. and about $1.5 \times 10^{-5}$ in/in °F. throughout the range of 0–250° F., a thermal conductivity of at least 0.7 watts/meter° K. and a dielectric strength of at least 250 volts/mil.

* * * * *